US011619967B2

(12) United States Patent
Thorsten Heiko Schelske et al.

(10) Patent No.: US 11,619,967 B2
(45) Date of Patent: Apr. 4, 2023

(54) MEASURE OF THE COLOR OF A CONTROLLED LIGHTING OF AN AREA OF INTEREST TARGET AND N COLOR MEASUREMENT TARGETS

(71) Applicant: COSNOVA GMBH, Sulzbach (DE)

(72) Inventors: Yannick Thorsten Heiko Schelske, Eschborn (DE); Gerardo Maria Priore, Frankfurt Am Main (DE); Jean-Louis Marie Marcel Mathiez, Limours (FR)

(73) Assignee: COSNOVA GMBH, Sulzbach (DE)

( * ) Notice: Subject to any disclaimer, the term of this patent is extended or adjusted under 35 U.S.C. 154(b) by 286 days.

(21) Appl. No.: 17/130,060

(22) Filed: Dec. 22, 2020

(65) Prior Publication Data

US 2021/0191457 A1 Jun. 24, 2021

(30) Foreign Application Priority Data

Dec. 23, 2019 (FR) .................... 1915512

(51) Int. Cl.
*G06T 7/90* (2017.01)
*G06F 1/16* (2006.01)
(Continued)

(52) U.S. Cl.
CPC .......... *G06F 1/1607* (2013.01); *G01J 3/0205* (2013.01); *G06T 7/557* (2017.01); *G06T 7/90* (2017.01); *G06T 11/001* (2013.01)

(58) Field of Classification Search
CPC ..... G06F 1/1607; G01J 3/0205; G01J 3/0272; G01J 3/0291; G01J 3/50; G01J 3/522;
(Continued)

(56) References Cited

U.S. PATENT DOCUMENTS 824,374 A 6/1906 Munsell
4,523,852 A 6/1985 Bauer
(Continued)

FOREIGN PATENT DOCUMENTS

DE 10 2004 033 585 A1 2/2006
EP 1866637 A2 12/2007
(Continued)

OTHER PUBLICATIONS

Search Report and Written Opinion dated Sep. 18, 2020 in corresponding French application No. 1915512; 11 pages.
(Continued)

*Primary Examiner* — Phuoc Tran
(74) *Attorney, Agent, or Firm* — Maier & Maier, PLLC

(57) ABSTRACT

A mobile phone accessory for a smartphone, including a support and handling casing with an internal space, an inner face, an orifice for association with an AOI target, located within a light incident spot, and a rear wall portion, a lighting element, to illuminate the spot, a camera field of view, to make a reflection photo of the spot, a scattering plate, having a scattering opening with a center and a center, including high-opacity and low-opacity portions, which include color measurement targets, fixed on the face of the front wall portion, sidely with the measurement orifice, through the scattering opening is seen the spot, the scattering plate has from a high-opacity degree on and around the center to a low-opacity degree at the opposite and near the scattering opening, the scattering plate making homogeneous the lighting and the extension of the AOI target and color measurement targets.

21 Claims, 16 Drawing Sheets

(51) Int. Cl.
*G06T 7/557* (2017.01)
*G06T 11/00* (2006.01)
*G01J 3/02* (2006.01)

(58) Field of Classification Search
CPC . G01J 3/524; G06T 7/557; G06T 7/90; G06T 11/001
See application file for complete search history.

(56) References Cited

U.S. PATENT DOCUMENTS

| | | | |
|---|---|---|---|
| 4,853,744 | A | 8/1989 | Reed |
| 5,963,333 | A | 10/1999 | Walowit et al. |
| 9,445,749 | B2 | 9/2016 | Erickson et al. |
| 9,749,502 | B2 | 8/2017 | Kishi |
| 9,906,697 | B2 | 2/2018 | Shin |
| 10,139,712 | B2 | 11/2018 | Shin |
| 10,551,248 | B2 * | 2/2020 | Jang ..................... G01J 3/027 |
| 2002/0036778 | A1 | 3/2002 | Wagner et al. |
| 2003/0169421 | A1 | 9/2003 | Ehbets |
| 2004/0062056 | A1 | 4/2004 | Heine et al. |
| 2014/0285806 | A1 | 9/2014 | Haas |
| 2017/0085761 | A1 | 3/2017 | Shin |
| 2018/0143076 | A1 | 5/2018 | Sheridan et al. |
| 2019/0279400 | A1 | 9/2019 | Xu |
| 2020/0033579 | A1 * | 1/2020 | Chou ............... G01N 33/54386 |
| 2020/0103283 | A1 * | 4/2020 | Tamal ..................... G01J 3/501 |

FOREIGN PATENT DOCUMENTS

| | | |
|---|---|---|
| FR | 2 826 856 A1 | 1/2003 |
| WO | 2004/081653 A1 | 9/2004 |
| WO | 2004081653 A1 | 9/2004 |
| WO | 2007/111353 A1 | 10/2007 |
| WO | 2007111353 A1 | 10/2007 |
| WO | 2012/058641 A2 | 5/2012 |

OTHER PUBLICATIONS

Kim, et al., "A Smartphone-Based Automatic Measurement Method for Colorimetric pH Detection Using a Color Adaptation Algorithm", Sensors, 2017, vol. 7; 13 pages.

Marguier, et al., "Assessing Human Skin Color from Uncalibrated Images", Wiley Periodicals, Inc., 2007, pp. 143-151, vol. 17; 9 pages.

Extended European Search Report dated Apr. 14, 2021, in connection with corresponding European Application No. 20216510.6; 7 pages.

* cited by examiner

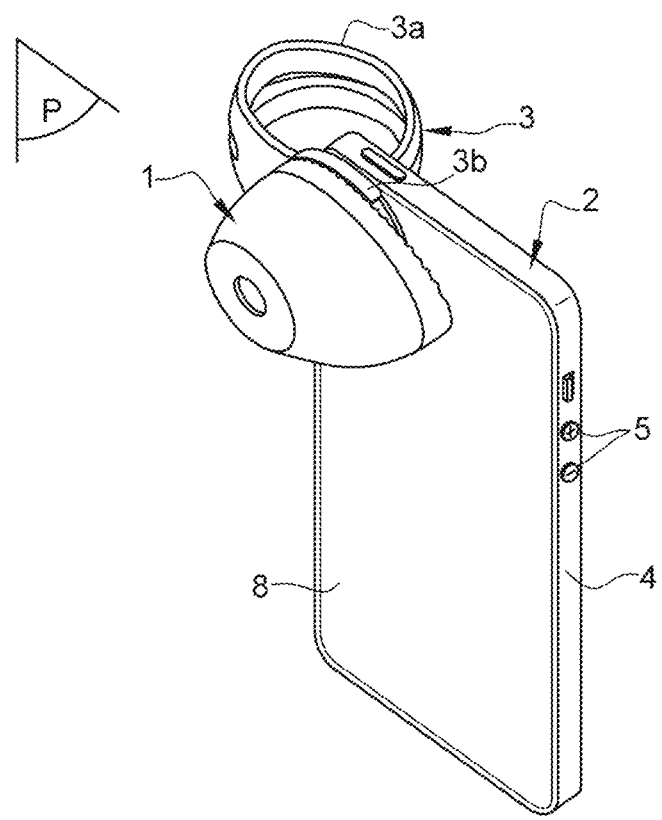
[Fig. 1A]

[Fig. 1B]
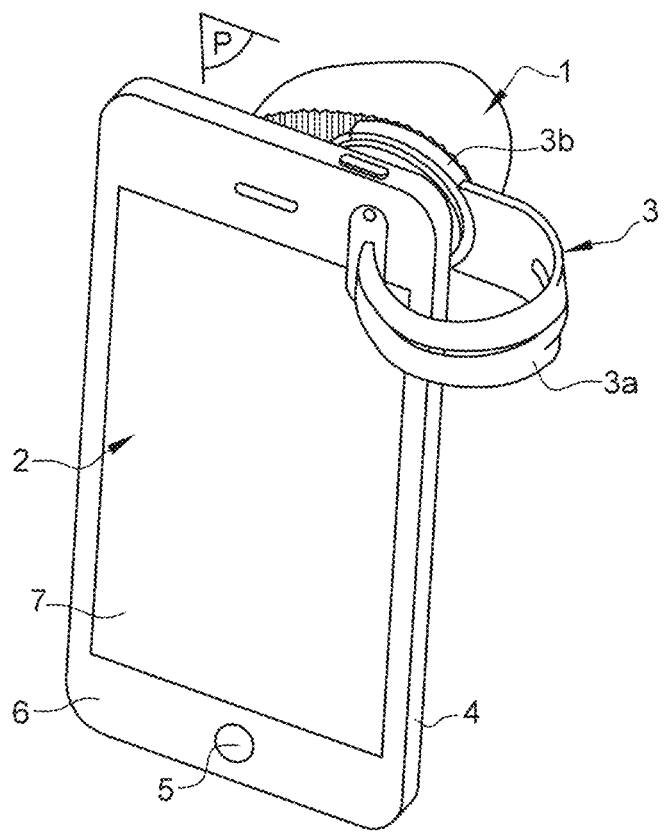

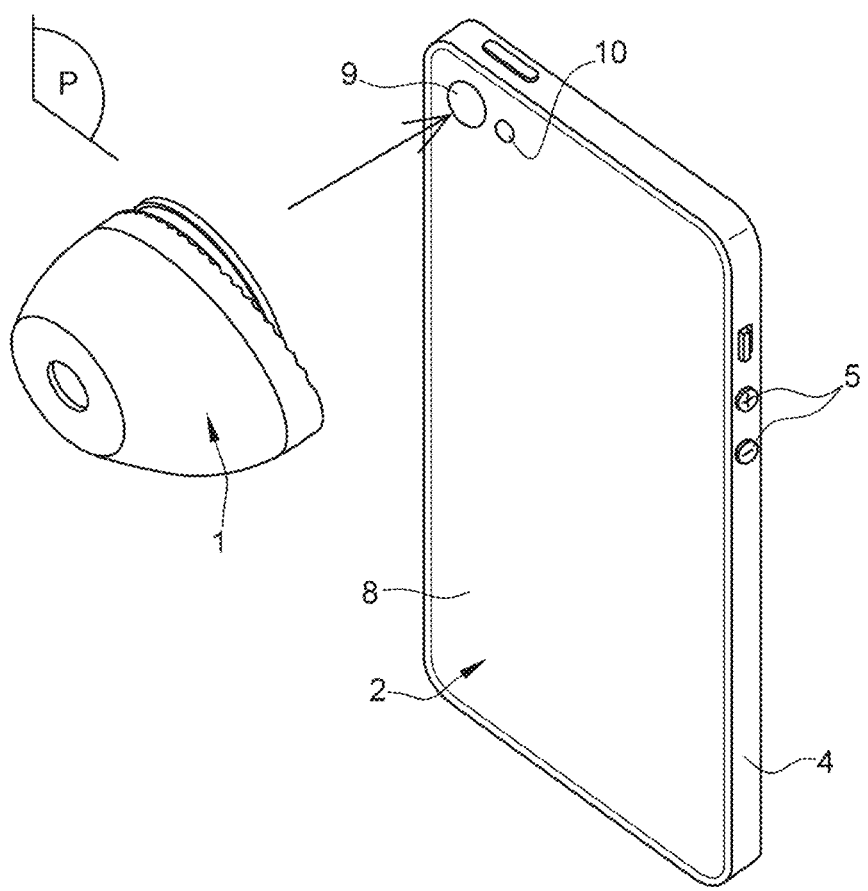
[Fig. 2]

[Fig. 3A]
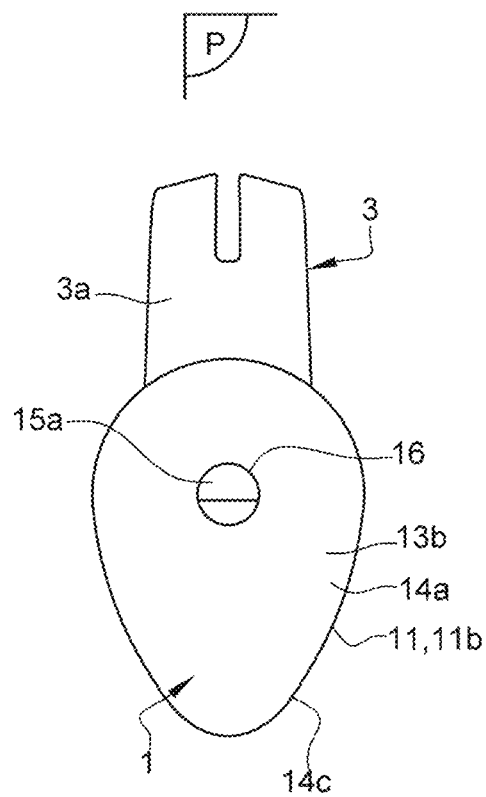
[Fig. 3B]
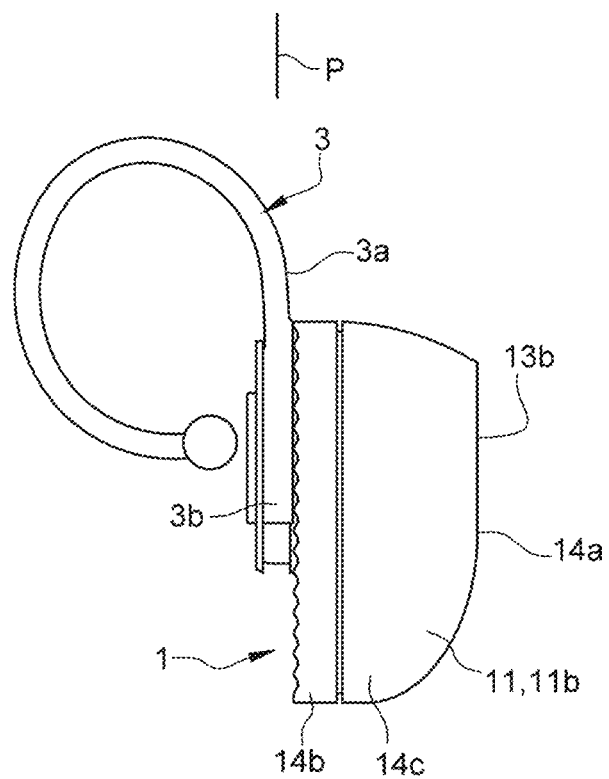

[Fig. 3C]
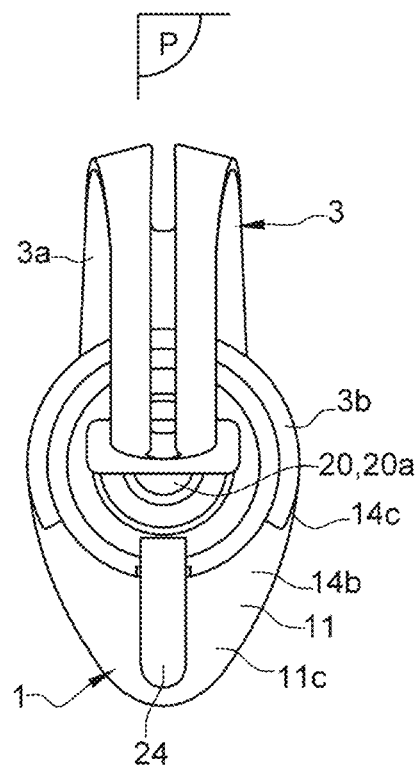
[Fig. 4]
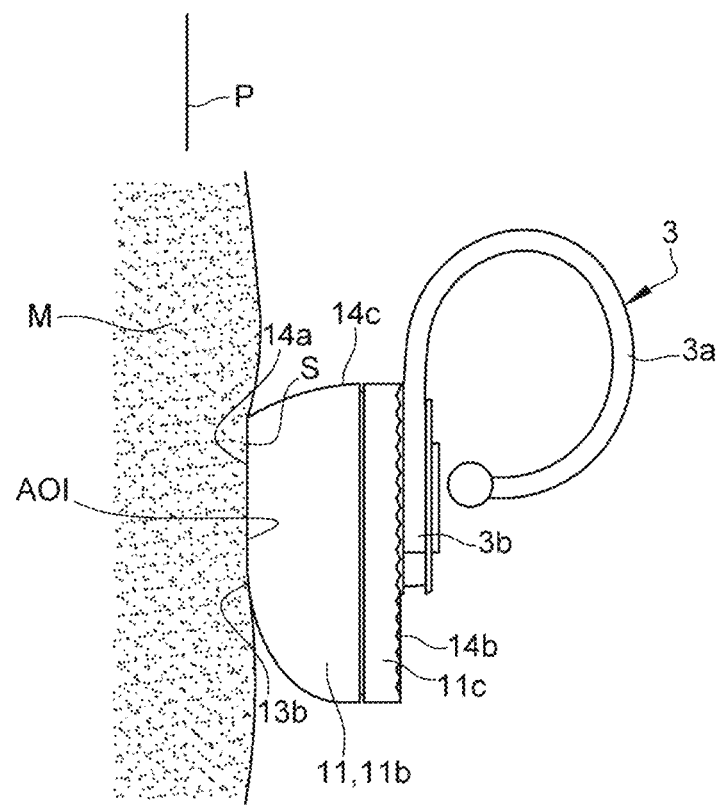

[Fig. 5A]
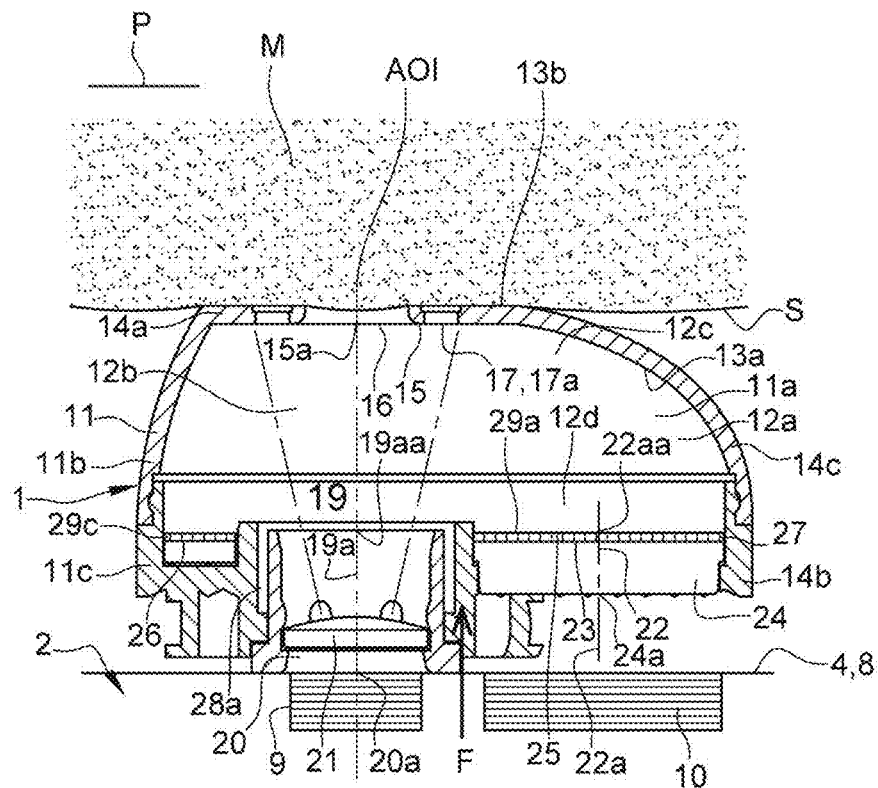
[Fig. 5B]
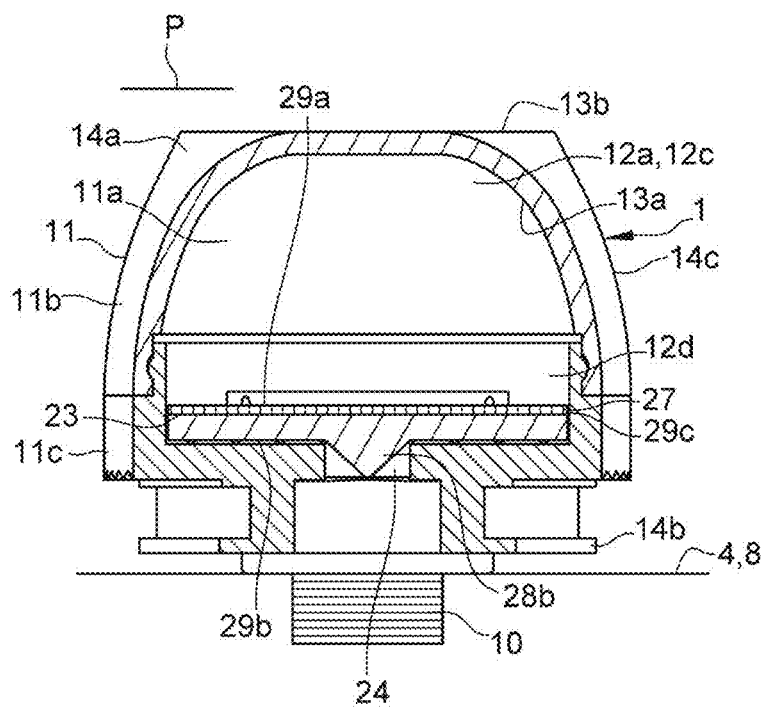

[Fig. 6]
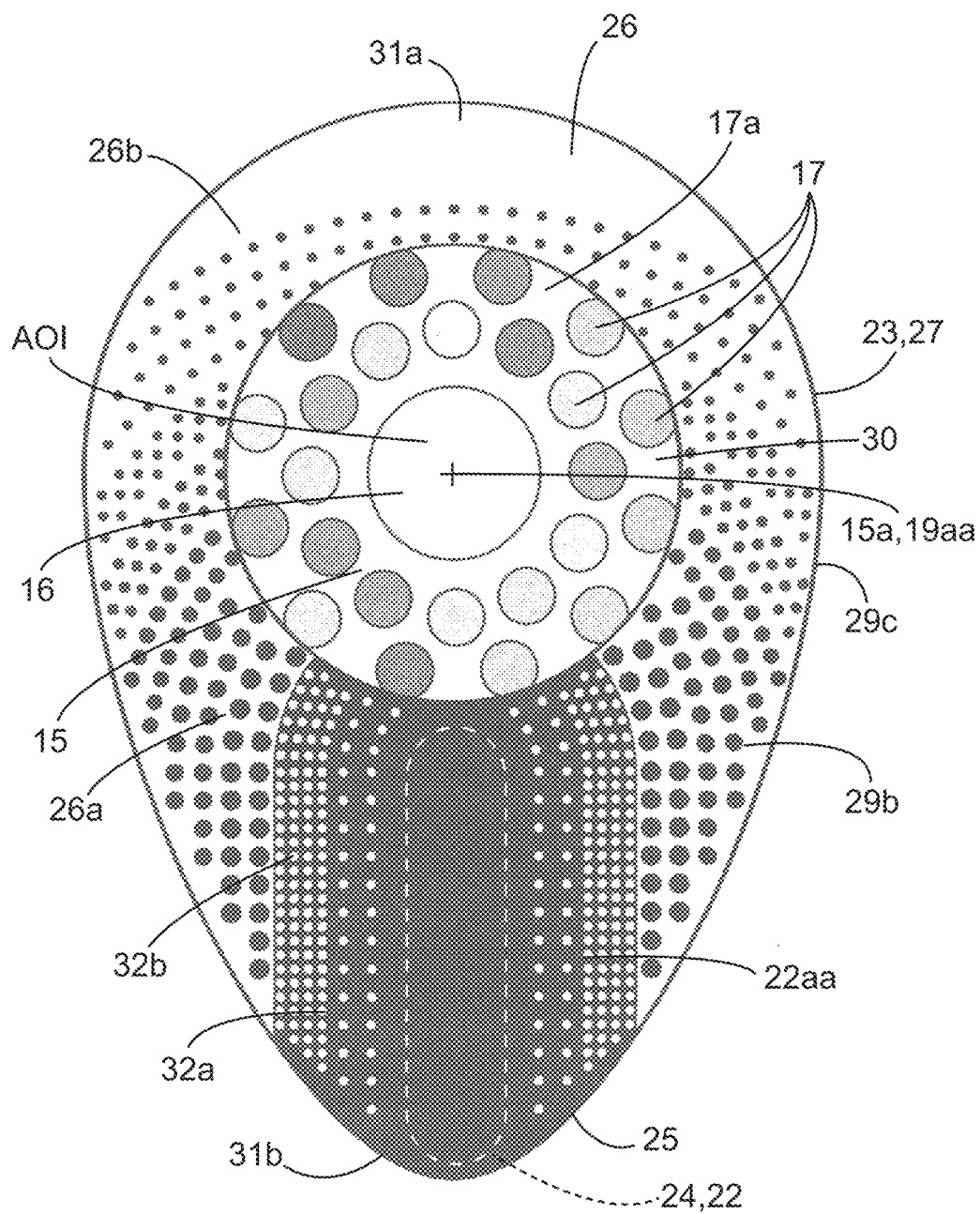

[Fig. 7]
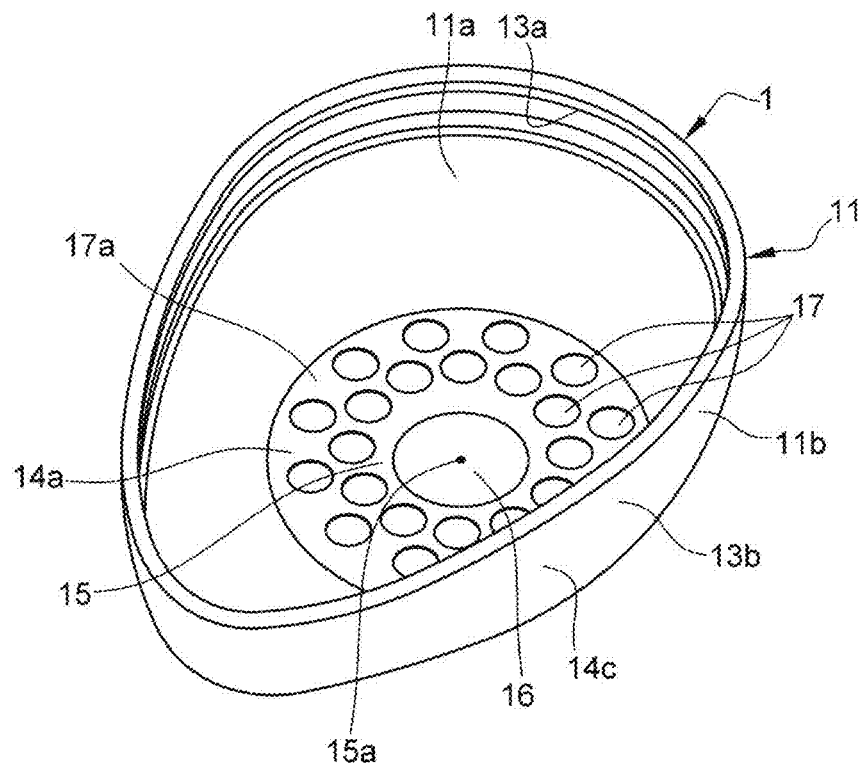
[Fig. 8A]
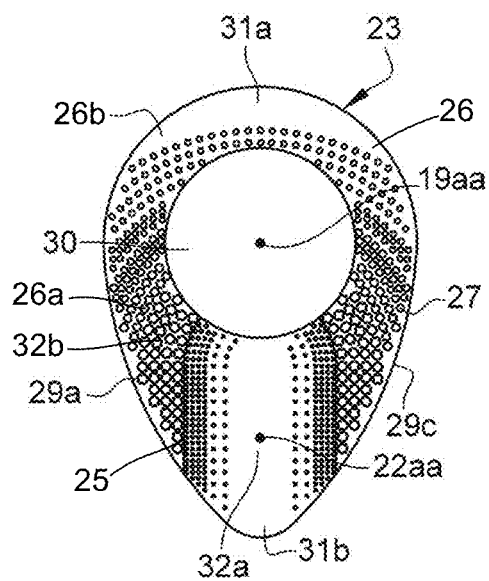

[Fig. 8B]
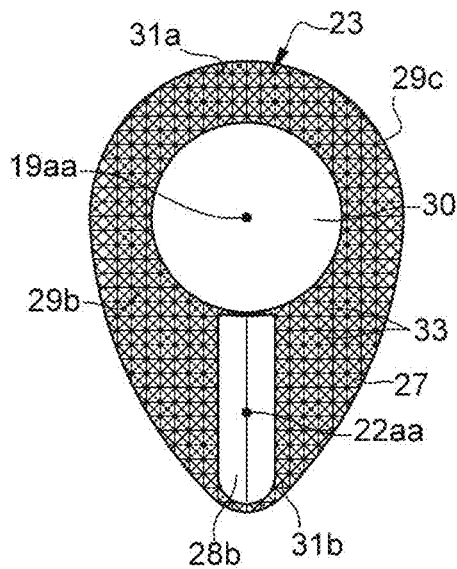
[Fig. 8C]
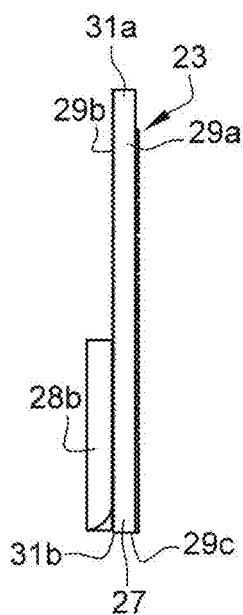
[Fig. 8D]
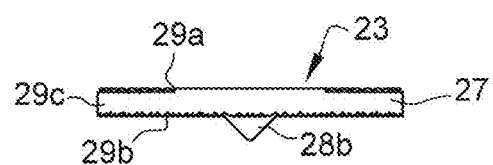

[Fig. 8E]
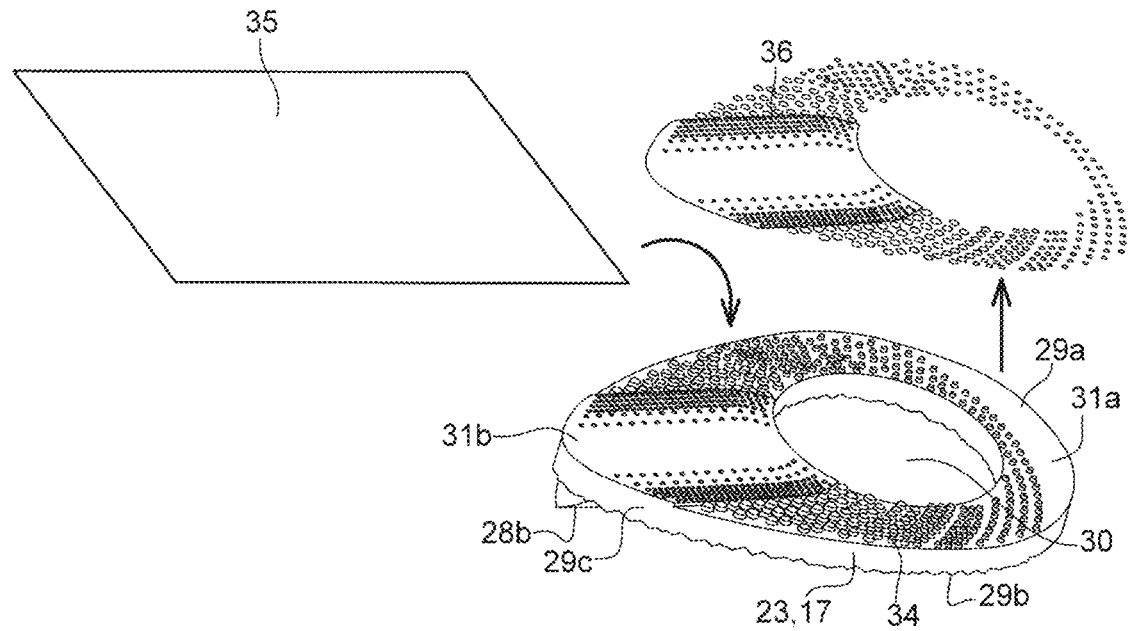
[Fig. 9]
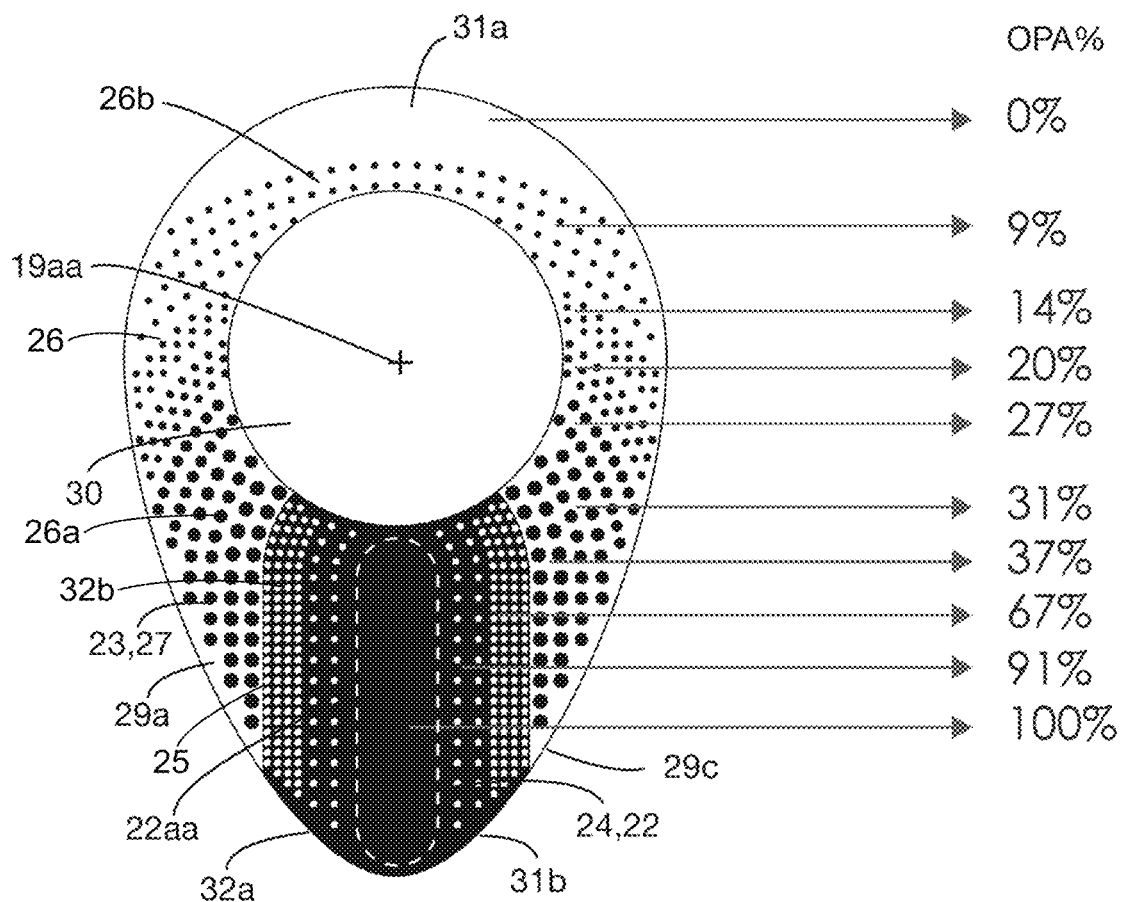

[Fig. 10A]
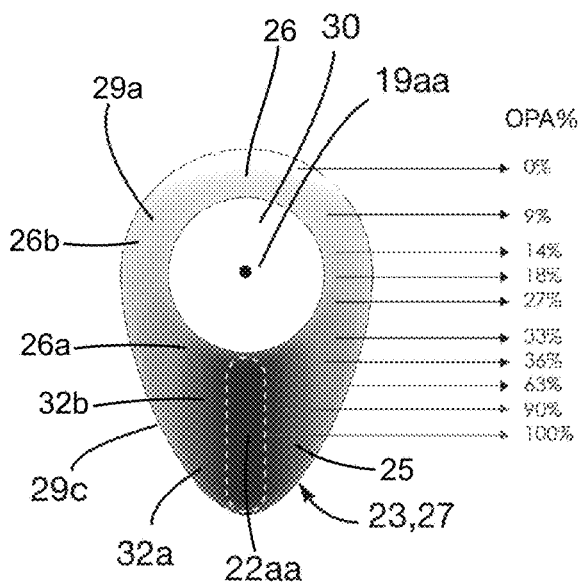
[Fig. 10B]
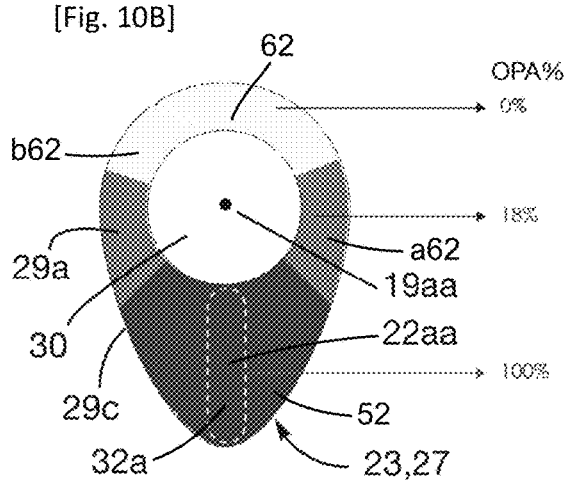
[Fig. 10C]
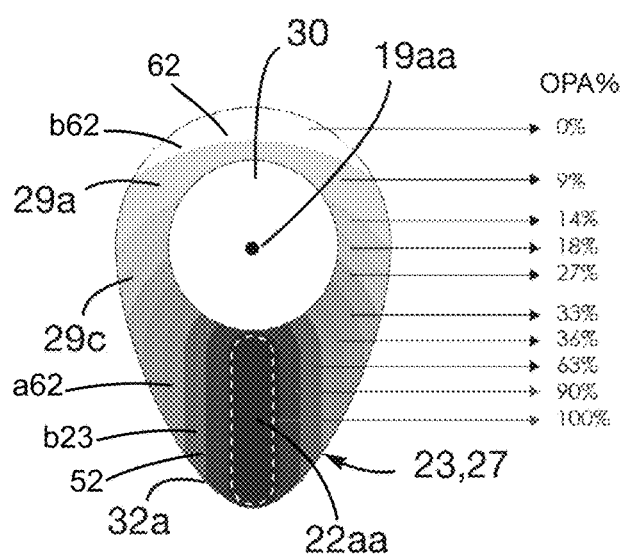

[Fig. 11A]
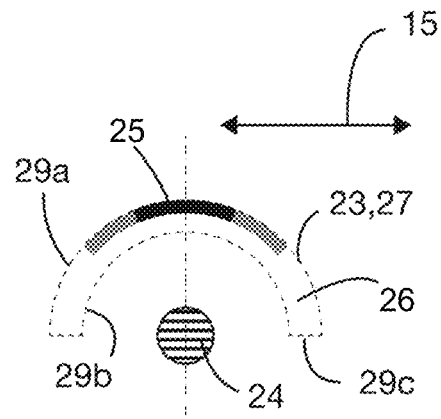
[Fig. 11B]
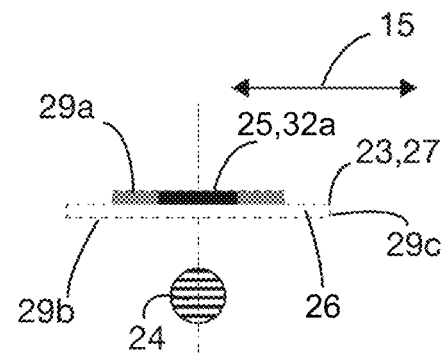
[Fig. 11C]
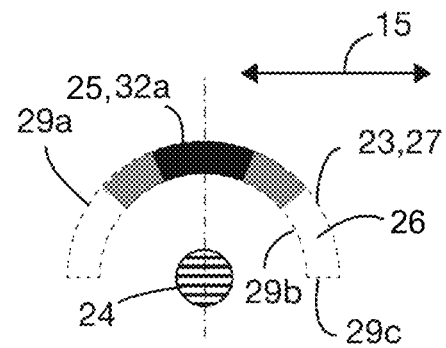

[Fig. 11D]
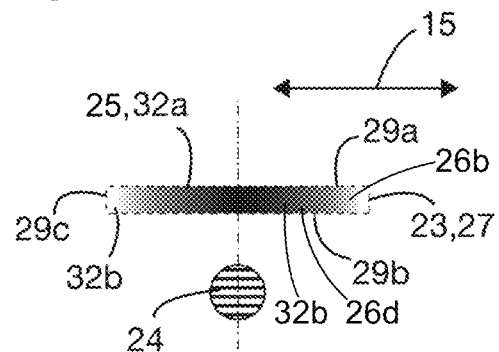
[Fig. 11E]
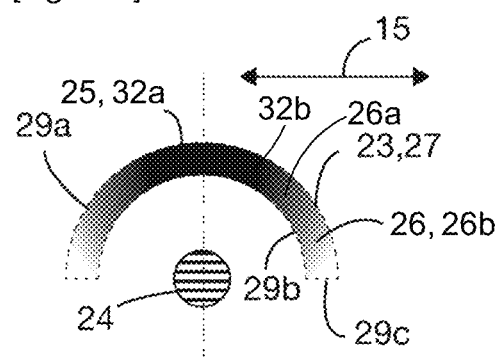
[Fig. 11F]
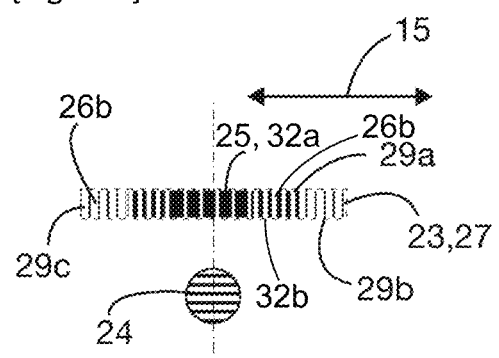
[Fig. 11G]
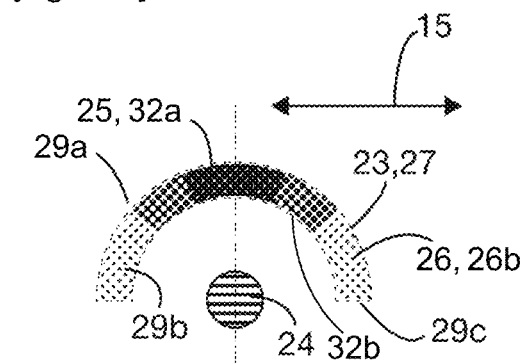

[Fig. 11H]
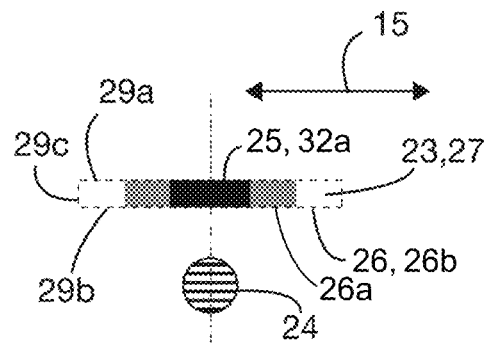
[Fig. 12A]
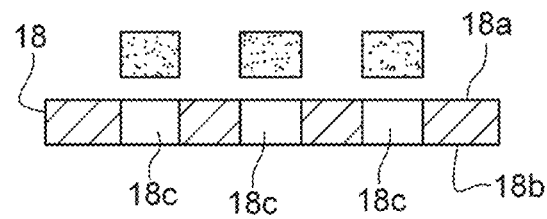
[Fig. 12B]
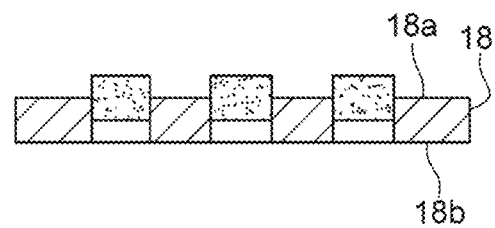
[Fig. 12C]
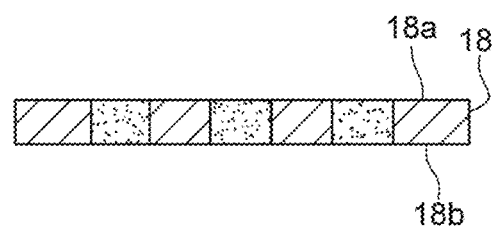
[Fig. 13A]
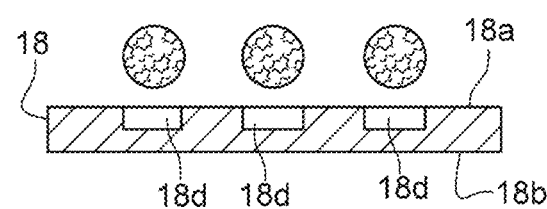

[Fig. 13B]
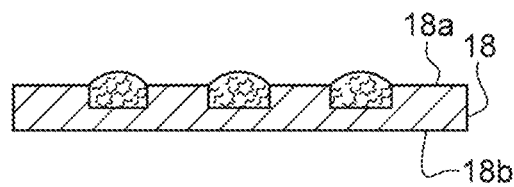
[Fig. 13C]
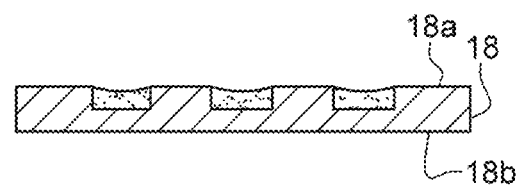
[Fig. 14A]
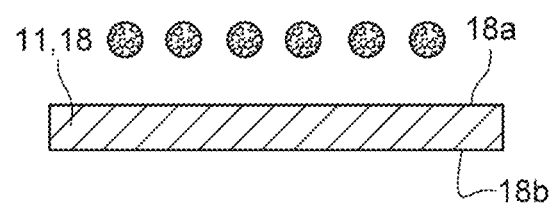
[Fig. 14B]
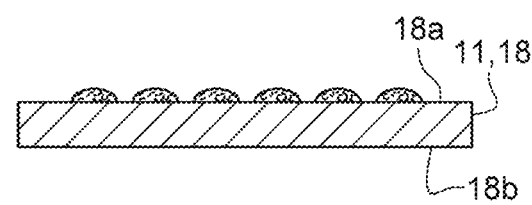
[Fig. 14C]
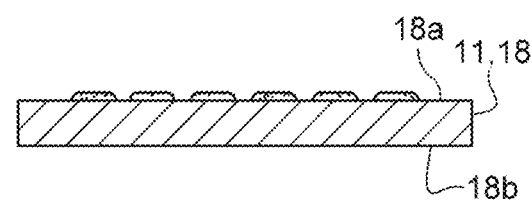

[Fig. 15]
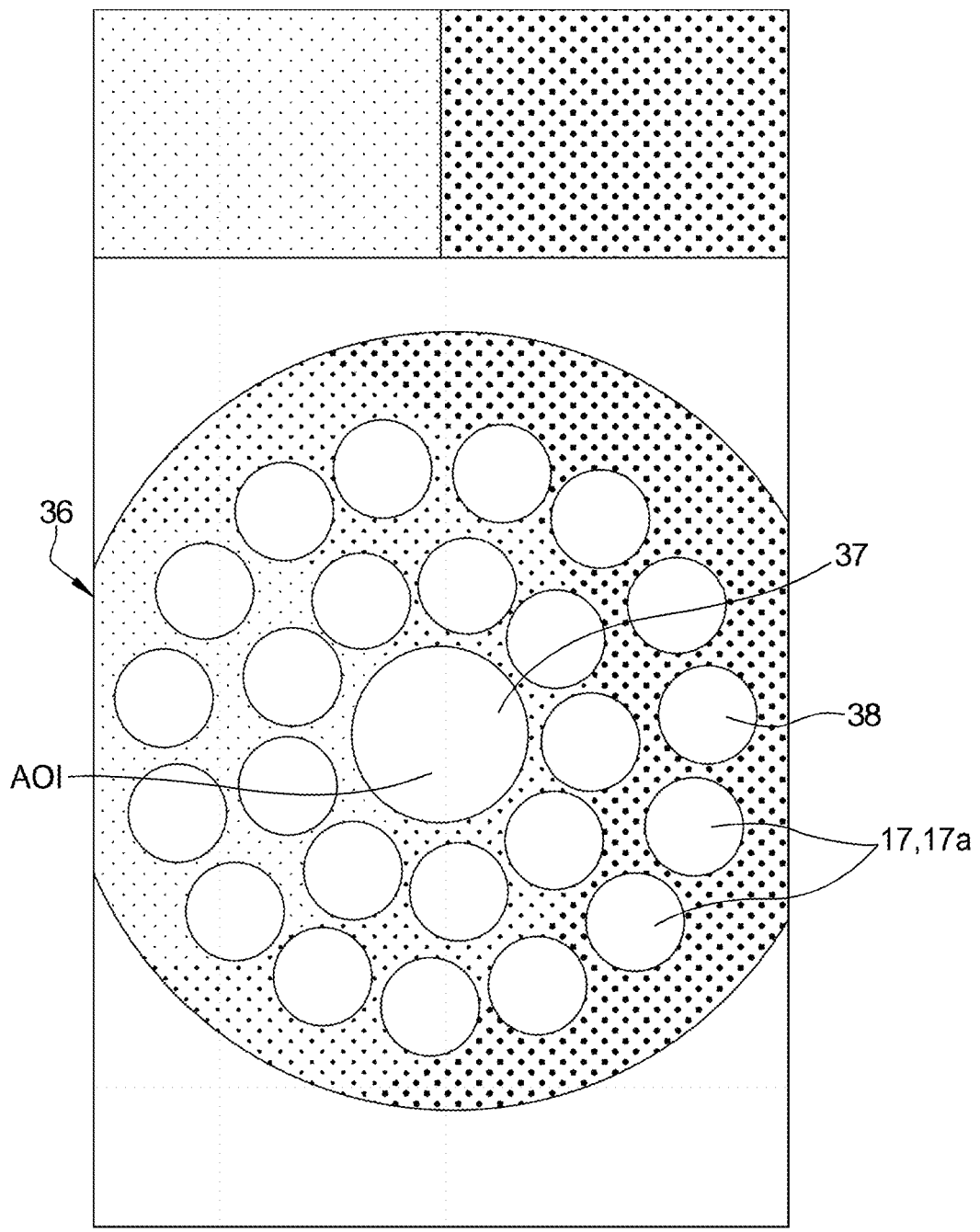

MEASURE OF THE COLOR OF A CONTROLLED LIGHTING OF AN AREA OF INTEREST TARGET AND N COLOR MEASUREMENT TARGETS

FIELD

The field of the invention is the measure of the color of an area of interest target of an original unaltered material from its exterior side founded on a comparison of the color of the photographed area of interest target with the colors of photographed appropriate number N of known and selected colors of color measurement targets, on a same photo obtained by reflection and with the same controlled and known illuminations conditions, i.e a light homogeneously distributed throughout the extension of the area of interest target and the color measurement targets. The measure of the color of the area of interest target can be possible by a user himself or herself, typically at home, with a smartphone accessory, suitable and intended to be functionally and structurally associated with a smartphone having a downloaded app to measure the color of a target. However, the field of the invention does not exclude professional use.

BACKGROUND

The words "area of interest" (most often referred to by its acronym AOI) must be comprised as a limited chosen surface zone of an original and unaltered material and not as a portion drawn from the material. The provision of the AOI target does not damage or does not require to deteriorate the material which remains in its original shape. So, the measure of the color of the AOI target is non-destructive.

Such an AOI target may be a zone of the skin of a human being (skin target).

The requirements and constraints above mentioned contribute to define the field of the invention. They are typical when the AOI target is a zone of the skin of a human being (skin target). However, there are other applications which have the same requirements and constraints, such as the measure of the color of a fashion accessory, an ornamental appearance, a textile, a painted wall, another cosmetic substance, or even the skin of an animal or a plant. That having been said, the following description is made with reference to skin target and the scope of the invention embraces other targets having the same features.

The measure of a person's skin color is intended more particularly for cosmetic, care, medical or utilitarian purposes. For example, a person might want to select a product having a color which matched with the color of his or her skin: cosmetic product (such as lipstick or face powder), clothes . . . . Or, a person might want to monitor how tan he/she is getting in the period following a long sun exposure. The word "skin" must be understood to comprise also the hair and more generally any part of the body of the human being.

U.S. Pat. No. 824,374 describes a system of charts in which all colors with their degrees of hue and their various degrees of strength and light found in pigments are displayed in a logical and convenient order and are expressed by symbols and upon which may be added and displayed the hues of newly-discovered pigments and their degrees of light and strength in the same order or sequence without disturbing the preexisting arrangement.

U.S. Pat. No. 4,523,852 describes an improved method and apparatus for visually comparing the results of colorimetric test means to a color reference standard, enabling improved quantitation to be achieved for such tests.

It is known color charts or reference cards or calibration cards, to compare several colors. They are flat sheets comprising on one face several colored reference targets called "calibration targets", such as in shape of squares side by side, arranged in lines and columns (twenty-four squares in the so-called Macbeth Color Checker). They are used to check the color reproduction of an imaging system or to calibrate camera (U.S. Pat. No. 9,749,502).

US2019/0279400 describes a color reference chart used to bracket the unknown color sample with a collection of known color values, which includes a plurality of discrete color reference elements or reflectance samples divided into four quadrants about a center portion which is an aperture or transparent window permitting the observation of a portion of the color sample when the color reference chart is placed in-between an image capture device and the color sample.

Based on the fact that images of a scene captured with multiple cameras will have different color values due to variations in color rendering across devices, the article *Assessing Human Skin Color from Uncalibrated Images* of J. Marguier and Al, published in ©2007 Wiley Periodicals, Inc. Vol. 17, 143-151, presents a method to accurately retrieve color information from uncalibrated images taken under uncontrolled lighting conditions with an unknown device and no access to raw data, but with a limited number of reference colors in the scene. This method is used to assess skin tones. A subject is imaged with the calibration target in the scene. This target is extracted and its color values are used to compute a color correction transform that is applied to the entire image. The best mapping is done using a target consisting of skin colored patches representing the whole range of human skin colors. The color information extracted from images is well correlated with color data derived from spectral measurements of skin.

It is known that mobile apparatus, or portable digital device, that can run a programmed application suitable for executing certain functionalities such as a smartphones, tablets, or the like, (the term "smartphone" must be understood in the generic sense mentioned above, and by ellipse all mobile apparatus or portable digital device as mentioned above is designated by the term "smartphone") that include a display, several buttons or digital keys or touchpads, a camera, a flashlight, a memory for data storage, and one or several downloaded applications (such an application is called by ellipse "app") have penetrated nearly all aspects of life, including monitoring and tracking of existing conditions (well-being, personal care) of the smartphone user, game playing, measurements, mapping of social networks, health, and so on. The use of the camera of the smartphone requires that it has been calibrated so that the colors captured are true to reality. That may be done based on the principle of colored calibration targets.

It is known that in terms of visual observation or via an optical device and in terms of photography, video, film, the lighting of the observed or shot target is of utmost importance. There are several types of lighting a target to shot, such as, basically, on one side, soft lighting and hard lighting and, on another side, front lighting, 45° lighting, side lighting, lighting from below and so on. And there are various ways to control light to manipulate how it interacts with the target to shot and various devices to do so, including reflectors, light diffusers, screens which are opaque or translucent, filters, and other optical devices (U.S. Pat. No. 4,853,744).

What has just been exposed is part of the general knowledge of the man of the art.

The invention is based on the principle of the use of N selected color measurement targets to measure the color of an AOI target, such as more particularly a skin target, and has for object and purposes to render possible this measurement as well quickly, easily, cheaply, precisely, automatically, and possibly by the user himself or herself, typically at home, with a smartphone accessory, suitable and intended to be functionally and structurally associated with a smartphone.

US2018/0143076 describes a device for measuring colour of a substrate which can interface via Bluetooth® with smartphones and convert the colour readings into any number of current colour models, or spaces. The device comprises a lower housing mating with an upper housing, a detector portion including a printed circuit board connected to the interior of the lower housing. The printed circuit board includes one LED and one colour sensor mounted on a bottom side of the printed circuit board. The device comprises one transparent light transmitting light pipe and a transparent lens mounted between the bottom side of the printed circuit board and the interior of the lower housing. The light transmitted by the LED impinges upon the substrate and is at least partially reflected back to the colour sensor to take a measurement. This device has the drawback to be expensive, which is inappropriate for a personal use.

US 2017/085761, U.S. Pat. Nos. 9,906,697 and 10,139,712 describe an apparatus for taking close-up pictures of the skin to view its state, or as a portable microscope, comprising a smartphone having a camera and a LED, and a smartphone accessory (called exterior optical module) for taking the close-up pictures, mounted on the smartphone. The smartphone accessory includes a macro lens, a light guide, and a housing with a hole. The light guide, formed of a transparent material, receives the light emitted from the LED, and emits the light in the direction of the optical axis through an emitting surface provided on an outer circumference of the macro lens, to illuminate a target in front of the hole. However, it is said that the target does not necessarily contact the hole. Such light guide includes a light incident part, a light emitting part, and a reflective plate preventing light that is inside the light guide part from leaking to the outside. The light emitting part is provided on an outer circumference of the macro lens, has a shape of a transparent flat plate, and emits the light transmitted from the light incident part through the emitting surface formed on its upper surface. The reflective plate is formed on an outer surface of the light guide. The light emitted from the LED to be entered through the incident surface may be transmitted to the light emitting part, and then emitted to the target. The light guide is either fully opaque or fully transparent. This apparatus does not include or works with colored targets and cannot capture a color. Furthermore, the emitting surface is not capable to produce a constant illuminance on the target surface, which is essential for a correct color measuring processing of the photo as described in the article *Assessing Human Skin Color from Uncalibrated Images* of J. Marguier and Al". So, this apparatus is not destinated nor adapted or even able to measure the color of an AOI target and its light guide is not adapted to a smartphone accessory, suitable and intended to be associated with a smartphone to measure the color of an AOI target.

WO2007111353 relates to a light diffuser characterized by comprising a light diffusing part formed of a foam produced by foaming through the application of radiation energy and thermal energy, the light diffusing part having a predetermined cell density distribution pattern. Such a diffusing part may comprise different zones.

U.S. Pat. No. 5,963,333 describes a hand-manipulatable device for gathering reflective, densitometric, spectrophotometric, colorimetric, self-luminous or radiometric readings from a sample surface, comprising a housing having a substantially flat bottom surface and a top surface contoured to fit to the fingers and palm of the human hand, a sensor mounted to the housing, including a focal aperture and including circuitry and optics for performing a reflective, densitometric, spectrophotometric or colorimetric reading from a portion of the sample surface aligned with the focal aperture, a switch operatively coupled to the sensor for activating it to perform the reading and a data link adapted to be operatively coupled between the sensor and a computer for relaying data from the sensor to the computer. The sensor includes a printed circuit board mounted within the housing, a plurality of light sources, mounted within the housing, respectively emitting light of a substantially different wavelength band, a sample photodetector mounted to the printed circuit board, a first optical element to direct a first portion of light emitted by each of the light sources to the sample surface, and a second optical element to direct a portion of light reflected from the sample to the sample photodetector. A reflector cone has a conical reflector surface inclined at 22.5° so that, light coming from the LED is reflected and hits the target with an angle of 45°. This device has the same drawbacks than mentioned above.

US2002/0036778 describes a handheld, portable color measuring device for measuring three different colors in a color target, comprising a color measuring probe housing, a hollow probe tip attached to one end of the probe housing, the probe tip being adapted for placing next to the color target to be measured, a white light source mounted inside the probe housing and connected to a power source, a color measurement switch mounted on the probe housing and connected to the power source and connected to the white light source, when the measurement switch is actuated, the white light source illuminating the color target surrounded by an end of the probe tip, means for capturing a reflected light signal off the color target when the color target is illuminated, disposed inside the probe housing, a three color sensor mounted inside the probe housing, receiving the reflected light signal from the means for capturing, a microprocessor mounted in the probe housing and connected to the power source and the three color sensor, the microprocessor for processing the reflected light signal, and display means connected to the microprocessor for displaying the reflected light signal in percentages of red, green and blue. The measurement of the color of the skin is not envisaged, and the device is neither lightweight nor cheap.

WO2012/058641 describes an optical apparatus releasable attached to a smartphone for imaging skin surfaces and cavities of the body. The apparatus comprises optical enhancement elements such as magnifying lenses, illumination diverting elements, and filters. It is provided lens slider to allow one or more lenses to be moved along the optical axis Images can be viewed and analyzed on the mobile device, or transmitted to another location/device for analysis by a person or software. The results can be used to provide diagnosis, or for a variety of other applications including image comparison over time and product recommendation. The apparatus may comprise a speculum for a body cavity or a cylindrical tube for a non cavity part of skin. It may comprises optical fibers, a diffuser, and a calibration module.

However, this optical apparatus is not adapted or destinated to measure the color of the skin by the user himself or herself.

WO2004/081653 describes a magnified photographing unit allowing the camera of a camera-equipped cell phone to shoot a magnified image using an illuminating light. The magnified photographing unit, which is used by being attached to a camera-equipped cell phone having a lens, an imaging element and an illumination, comprises a magnifying lens, a first reflection mirror, and a second reflection mirror housed in a body provided on the front surface thereof with a contacting portion and on the rear surface with a first aperture, a second aperture and second member used to detachably attach the unit to the camera-equipped cell phone. When the magnified photographing unit is attached to the camera-equipped cell phone, the magnifying lens is positioned in front of the lens of the cell phone to allow magnified image photographing. In addition, an illuminating light from the illumination of the cell phone is sequentially reflected off the second reflection mirror and the first reflection mirror and led to a subject to thereby illuminate it.

US2014/0285806 relates to methods and means for calibrating and matching colors and light. Some embodiments also incorporate additional functionality including, but not limited to communication, sensing, display and data processing elements. Various embodiments may be performed by and/or implemented in hardware, in software, by one or more entities, and/or by some combination of hardware, software and/or one or more entities.

DE102004033585 describes a method for the automatic determination of colors, characterized in that at least one color to be determined is recorded in a computer-readable manner together with one or more reference colors, such as gray levels G1 to G16, red, yellow, blue, white and/or black, one on a data processing device Installed computer program—reads in the recorded data,—compares recorded data of at least a part of the reference colors with stored comparison values of the reference colors,—the color (s) to be determined automatically by evaluating at least part of the recorded data of the color to be determined and at least a part of the difference values determined in the comparison between the read-in data and stored comparison values.

It is known dermatoscopes which comprise one or more magnifying lenses and a lighting system intended to make precise observations of skin. They do not comprise camera, electric sensor processor, or software application able to determine the color of the skin target and in addition are not so small and lightweight and adapted to a personal use. US 2004/0062056 describes a dermatoscope having several LED arranged all round optics, for indirect illumination of a skin target. It is provided an optical waveguide in front of each LED, being a conical prism with a hole, to whose end facing the skin target, a contact plate which being provided and is composed of glass or transparent plastic. FR2826856 describes a dermatoscope comprising an atlas having a plurality of pictures reference device or means for displaying reference pictures, and a portable optical instrument for directly observing an area of the skin comprising means arranged to produce a picture of the skin target that can be compared to one of the reference pictures. The skin target may be illuminated by means of a lighting means with different inclinations. The optical instrument comprises at least one screen capable to be interposed between a light source and the skin target, so as to allow illumination of the latter only by diffusion of light under the screen. Such dermatoscopes do not guarantee a sufficiently homogeneous lighting of the skin target, and the color of the skin is not measured.

U.S. Pat. No. 9,445,749 and other linked patents or patent applications at the same name of assignee, describes a smartphone accessory, suitable and intended to be associated with a smartphone to measure color of a sample target, which includes an opaque housing so that the accessory is externally light-tight when a sample target is disposed therein, and that can be removably attached to the smartphone in a manner that at least optically couples the smartphone accessory to a smartphone camera. Taking into consideration that insufficient homogeneous brightness of the lighted sample target affects the colorimetric measurements, it is provided three possible arrangements. In a first one, it is provided a designed-in, indirect optical path that redirects the light from the smartphone flash around a partial wall structure in the housing of the accessory so as to illuminate the rear surface of the sample target with diffuse light. A second one, also makes use of the flash to illuminate the sample target with a diffuser not more described, incorporated between the flash and the front surface of the sample target. A third one makes use of a LED mounted in the housing of the accessory behind the sample target with a light diffuser disposed between the LED and the rear surface of the sample target. With this last arrangement, the accessory includes not only such LED but also a battery. Such a smartphone accessory associated with a smartphone is specially destinated to the measurements and analyses of sample targets which are analytes such as bodily fluids like sweat, saliva, urine, blood, and others. For that, it is provided regarding the targets, a modular test platform such as test strip having a test region and a calibration region, receiving a target analyte, and having the appropriate chemistry and shape to be used in the smartphone and enable the embodied colorimetric reaction. Furthermore, such a smartphone accessory associated with a smartphone is not only destinated but nor adapted or even able to measure the color of a skin target. Finally, this smartphone is not adapted personal use.

EP1866637 describes a similar smartphone accessory, suitable and intended to be associated with a smartphone to measure color of a test strip (sample target) disposed within a removably test wand. The device can work as well according through transmissive mode or reflectance mode depending if the light beam is transmitted through the test strip or is reflected on it. The LED is located within the accessory and is associated with a spread glass or plate to distribute the light. Such an accessory has the same drawbacks and limitations than above.

The article *A Smarthone-Based Automatic Measurement—Method for Colorimetric pH Detection Using a Color Adaptation Algorithm* of Sung Deuk Kim and al, describes in general terms a device used for measuring the color of a pH indicator paper (sample target) based on a comparison with a colored reference target paper located on its side, the camera taking at the same time a picture of booth the pH indicator paper (sample target) and the colored reference target paper.

US2003/0169421 describes a spectrophotometer where the electronic circuit and the LED located in standard housings are installed on a common circuit board. Several LED are arranged in a circle and concentrically with a collecting channel. The light of each LED is guided through a filter. A diffraction disc is positioned in the light path after the LED and angularly mixes the light beams. A first condenser lens captures the light. A second imaging system consisting of a combination of imaging lens and redirecting mirror then creates a limited illumination spot in the measurement target under a specific angle of incidence, i.e. 45°. Such a spectrophotometer is not appropriate to the measurement of the color of a skin target as well quickly, easily, cheaply, precisely, automatically, by the user himself or herself, with a smartphone accessory.

There is a need of a device to measure the color of a AOI target of an original unaltered material, from its exterior side, such as the color of the skin target, intended more particularly for cosmetic or analogous purposes, that is cheap, lightweight, easy to handle and to process, precise, that can be used by the user himself or herself, typically at home, taking advantage of an already existing smartphone having a camera and a flash, and a downloaded app appropriate for measuring color in a photo, (or arranged to fulfill a transmission to a different location or a different processing device where is done the appropriate processing for measuring color in a photo), to which can be functionally and structurally associated a smartphone accessory.

As regards US2017/085761, the problem to solve is to render the smartphone accessory capable to do a measure of the color of an AOI target (here the skin), founded on a comparison of the color of the AOI target with an appropriate number N of known and selected colors of color measurement targets, on a same photo obtained with the same illuminations conditions, i.e. a light homogeneously, distributed throughout the extension of the AOI target and the color measurement targets.

SUMMARY

According to one aspect, the invention has for object a mobile phone accessory, suitable and intended to be functionally and structurally associated with a portable digital device capable of running a program for executing functions, such as a smartphone having a camera and a flash, and to be associated with an area of interest AOI target of a material M, comprising:

a support and handling casing having an opaque wall which delimits an internal space adapted, for use, not to be disturbed by light from outside, the wall having an inner face and comprising an orifice suitable and intended to be associated with the material M and the AOI target, located within a light incident spot, and a rear wall portion, a lighting means having a lighting axis, arranged at least partly in the casing, adapted and intended to produce, for use, the light illuminating the light incident spot, a camera field of view means, having a field of view axis, arranged at least partially in the casing, adapted and intended for use in making a reflection photo of the light incident spot and its content, a scattering plate, located within the casing, adapted and intended, for use, to be functionally associated with the lighting means, having a scattering opening with a camera field center at the intersection of the field of view axis, and a lighting center at the intersection of the lighting axis, and comprising a high-opacity portion located near the lighting means and a low-opacity portion located at the periphery of the high-opacity portion.

This mobile phone accessory is characterized by the following features:

the casing comprises a front wall portion which extends facing and spaced from the rear wall portion and where is located the orifice, being a measuring orifice, the outer face of the front wall portion comprises an area surrounding the measuring orifice adapted and intended to put in contact with the material M located outside, around the AOI target, and to conceal any passage of ambient exterior light, it includes N color measurement targets, located within the internal space and fixed on the inner face of the front wall portion, sidely with the measurement orifice, forming together a color measurement area unity, through the scattering opening is seen the light incident spot with the measuring orifice, and in use the AOI target, and the N color measurement targets, located within the camera field of view means, the scattering plate has a varying degree of opacity, with a high-opacity degree in portion or region on and around the lighting center, a low-opacity degree in portion or region at the opposite and near the scattering opening, and decreasing degrees of opacity from portion or region with high-opacity degree to portion or region with low-opacity degree, the scattering plate making homogeneous the lighting as well the extension of the AOI target and the extension of the N color measurement targets.

So, the mobile phone accessory is suitable and intended to allow to do a photo of the lighted AOI target and the lighted N color measurement targets, with the same homogeneous illumination conditions.

According to an embodiment, the high-opacity portion, the low-opacity portion, has a degree of opacity unequal regarding its extent, the scattering plate having a high-opacity degree in a region on and around the lighting center, a low-opacity degree in a region at the opposite of the region and near the scattering opening, and decreasing degrees of opacity in regions from the region of high-opacity degree to the region of low-opacity degree.

According to an embodiment, the degree of opacity of the scattering plate varies either continuously or discretely.

According to an embodiment, the degree of opacity of the high-opacity portion or its region, his greater than that of the low-opacity portion or its region, being greater than 70%, in particular greater than 80%, in particular greater than 90%, in particular equal to or close to 100%, being then opaque.

According to an embodiment, the degree of opacity of the low-opacity portion or its region is smaller than that of the high-opacity portion or its region, being smaller than 70%, in particular smaller than 10%, in particular equal to or close to 0%, being then fully transparent.

According to an embodiment, the degree of opacity of the scattering plate varies from fully opaque to fully transparent.

According to an embodiment, the scattering plate is made in plastics material charged of blackout pigments with the desire density so as to obtain the appropriate variation of the degree of opacity.

According to an other embodiment, the scattering plate comprises a transparent back on which are fixed portions of film or dots having an opacity permitting to obtain the appropriate variation of the degree of opacity. As a possibility, the scattering plate alternates high opacity portions with low opacity portions so as to create an opacity which averages between them.

According to an embodiment, the mobile phone accessory does not include intrinsically a light source such as LED being extrinsic to the accessory like the flash of the smartphone.

According to an embodiment, the camera field of vision means includes a camera window located within the rear wall portion, adapted and intended for the passage of a visual field from an camera extrinsic to the accessory, like the camera of the smartphone, the mobile phone accessory being characterized in that it does not include intrinsically a camera.

According to an embodiment, the camera visual field means comprises a lens in order to have a semi-focus on the center of the AOI target, and a semi-focus on—if not all—at least a significant number of the centers of the N color measurement targets, such as a majority of such targets.

According to an embodiment, an appropriate number N of color measurement targets is sufficient to permit an accurate measure of the color of the AIO target, and the colors are selected to have defined colors within a narrow gamut of colors representing the whole range of AOI target colors, forming together a color measurement area unity, the mobile phone accessory being so suitable and intended to allow to measure the color of the AOI target, by allowing to do a photo of the lighted AOI target and the lighted N color measurement targets, with the same illuminations conditions, such photo being processed to compare the color of the photographed AOI target with the colors of the photographed color measurement targets of the color measurement area unity, in order to measure the color of the AOI target.

According to an embodiment, the color measurement targets are arranged side by side along at least one line of the color measurement area unity, while the color measurement targets belonging to two successive lines are arranged side by side.

According to an embodiment, the color measurement area unity has a greater radius being firstly less than 4 times the radius of the measuring orifice, in particular less than 3 times and, secondly, more than 2 times the radius of the measuring orifice.

According to an embodiment, the number N of the color measurement targets, sufficient to permit an accurate measure of the color of the AIO target, is at least 20, less than 50, in particular less than 40, in particular less than 30, in particular equal or close to 25.

According to an embodiment, one color measurement target is in shape of a dot having a width less than 1 cm, in particular less than 0.7 cm, in particular less than 0.5 cm, in particular equal or close to 0.2 cm.

According to an embodiment, the mobile phone accessory is characterized by the process to realize the color measurement area unity of the N color measurement targets, comprising the following steps:

having available large quantities of several basic colored materials, of which fractions can be took, having available substratum, being either the casing or a separate substratum later fixed onto the casing, preparing N stocks of elaborated colored materials from the basic colored materials, by mixing adequate fractions of certain identified basic colored materials, so that each stock of elaborated colored material has a precise color being exactly the color of an intended color measurement target, sampling a small amount of elaborated colored material from each the N stocks, so as to have available N samples of small amount of the elaborated colored materials, depositing the N samples of the elaborated colored materials, in proper order and arrangement, onto the substratum so as to form the color measurement area unity of the N color measurement targets.

According to one other aspect, the invention has for object a device for measuring the color of an AOI target being an area of interest of a material M, in relationship with an appropriate N color measurement targets having defined colors within a narrow gamut of colors representing the whole range of AOI target colors, by doing an illumination and a reflection of light on the AOI target and the N color measurement targets, a photo of the illuminated AOI target and the illuminated color measurement targets with the same homogeneous illuminations conditions, such photo being processed to compare the color of the photographed AOI target with the colors of the photographed color measurement targets of the color measurement area unity, in order to measure the color of the AOI target, comprising:

a smartphone, capable of running a program for executing functions, such as a smartphone having a camera, a flash, and an appropriate processing for measuring color in a photo, a mobile phone accessory as it has been described, and a removable connecting means to fix the mobile phone accessory onto the smartphone, in particular in one piece with the accessory.

According to an embodiment of the device:

the light to illuminate the AOI target and the N color measurement targets is the flash of the smartphone, the camera to do the photo of the illuminated AOI target and the N color measurement targets is the camera of the smartphone, the mobile phone accessory being arranged to allow the passage of a light beam produced by the flash of the smartphone, and to allow the passage of a visual field from the camera of the smartphone, an appropriate processing for measuring color in a photo, such as an app, being loaded in the smartphone, not in the mobile phone accessory.

According to one other aspect, the invention has for object a process for measuring the color of an AOI target being an area of interest of a material M, in which:

having available a material M having an area of interest AOI of such material, having available a smartphone capable of running a program for executing functions, such as a smartphone having a camera and a flash, on which is loaded an appropriate processing for measuring color in a photo, such as an app, having available a mobile phone accessory as it has been described, associating structurally the smartphone and the mobile phone accessory by means of the removable connecting means, applying reciprocally the material M and the mobile phone accessory so that the material M is on the outer face of the casing with the AOI target in front of the measuring orifice, ordering the smartphone to do a flashlight and a photo so that we do an illumination and a reflection of light on the AOI target and the color measurement targets and a photo of the illuminated AOI target and the color measurement targets, with the same homogeneous illuminations conditions, and with the appropriate processing for measuring color in a photo, processing the photo so as to measure the color of AOI target.

According to an embodiment of the process, the material M is the skin of a person and in which it is carried out by the person, the color of the skin being measured.

According to one other aspect, the invention has for object a photo of an AOI target and N color measurement targets, obtained by the device as it has been described, the photo being suitable to be processed with an appropriate processing for measuring color in a photo, the photo comprising two adjacent zones, a zone showing the photographed AOI target and a zone showing the photographed N color measurement targets.

BRIEF DESCRIPTION OF DRAWINGS

FIGS. 1A and 1B, are two perspective views, from the rear and the front, respectively, of a smartphone structurally associated, due to a removable connecting means, with a mobile phone accessory, according to the invention, the smartphone and the mobile phone accessory together being a device for measuring the color of an area of interest (AOI) of a material M, in relationship with N color measurement targets.

FIG. 2 is one perspective, exploded, view showing the rear face of the smartphone and the mobile phone accessory, not structurally associated, but with the arrow symbolizing this association, the removable connecting means not being represented, showing, as regards the smartphone, the lens of the camera and the flash.

FIGS. 3A, 3B and 3C are three outside views, from front, rear and side, of the mobile phone accessory with the removable connecting means mounted on it. The figures show the casing outer face of the mobile phone accessory. 3A shows more particularly the front wall portion of the casing and the measuring office. 3B shows more particularly the rear wall portion of the casing, the camera window the lighting window. 3C shows more particularly the peripheral wall portion of the casing.

FIG. 4 is a view like FIG. 3C showing the material the color of which has to be measured, such as the skin of a person, in contact with the outer face of the front wall portion of the casing, the AOI target being in correspondence with the measuring orifice.

FIG. 5A is a cut view according to a median reference plane of the mobile phone accessory, the neighboring part of the smartphone, the material in contact with the outer face of the front wall portion of the casing and the AOI target in correspondence with the measuring orifice. This figure shows, as regards the mobile phone accessory, the casing, the measuring orifice, the color measurement area unity, the light incident spot, the camera visual field, the lighting window, the camera window, the scattering plate This figure shows, as regards the smartphone, the part of the housing in contact with the mobile phone accessory, the lens of the camera and the flash.

FIG. 5B is a cut view according to a transversal plane perpendicular to the reference plane, of the mobile phone accessory and the neighboring part of the smartphone (housing).

FIG. 6 is view according to the arrow F of FIG. 5A, which shows the scattering plate having, juxtaposed, a high-opacity portion and regions and a low-opacity portion and regions, with a degree of opacity OPA % varying continuously, from fully opaque to fully transparent, and having a scattering opening through it is viewed, as it is for a camera field of view, the light incident spot with the measuring orifice and the color measurement targets. On FIG. 6 is represented in dotted lines the location of the lighting window.

FIG. 7 is a perspective view of the inner face of the front wall portion of the casing and its peripheral wall portion, which shows the light incident spot with the measuring orifice and the color measurement targets.

FIGS. 8A, 8B, 8C and 8D are, respectively an elevation view of the front face of the scattering plate and of its rear face and two side views of the scattering plate. The figures show the contour of the scattering plate, its scattering opening, the variation of its opacity degree, and a protrusion of its rear face to the structural association with the casing.

FIG. 8E is a perspective view of the scattering plate of the FIGS. 8A to 8D, which illustrates symbolically how it can be realized to obtain a variation of opacity.

FIG. 9 is an elevation scheme of the scattering plate, according to one possible embodiment showing the variation of its degree of opacity OPA %, that is here two extreme degrees of opacity of 100% and 0% and eight intermediate decreasing degrees of opacity between, that is 91%, 67%, 37%, 31%, 27%, 20%, 14% and 9%. On FIG. 9 is represented in dotted lines the location of the lighting window.

FIGS. 10A, 10B and 10C are three elevation schemes of three possible, but not limited, other embodiments of the scattering plate of FIG. 9. On the figures, the possible location of the lighting window is represented in dashed lines. On 10A, the scattering plate comprises a full opaque portion about its tapered side till the scattering opening, a fully transparent near the scattering opening and the bulbous side and intermediate decreasing degrees of opacity varying continuously. In 10B there are two extreme degrees of opacity of 100% and 0% and an intermediate medium degree opacity portion, here 18%, with a discontinuous variation. The three schemes illustrate many possible arrangements of the scattering plate with different degrees of opacity. Represented in dotted lines is the location of the lighting window.

FIGS. 11A to 11H are eight schemas showing other possible embodiments of the scattering plate. On these figures, a schematic circle represents the lighting window or the light source, and a double arrow represents the light incident spot. According to the embodiments, the scattering plate is flat (f11B, 11D, 11F and 11H) or curved (11A, 11C, 11E, 11G). According to the embodiments, the degree of opacity OPA % varies continuously (11D, 11E) or discretely (11A, 11B, 11C, 11F, 11G, 11H).

FIGS. 12A, 12B and 12C are three schemas which represent the successive steps according to a first possible variant embodiment to deposit samples of elaborated colored materials onto substrate means, in which the substratum is a solid-state support provided with through holes side by side, and the samples of the elaborated colored materials are in solid state and in complementary shape of the holes of the substratum.

FIGS. 13A, 13B and 13C are three schemas which represent the successive steps according to a second possible variant embodiment, in which the substratum is a solid-state support provided with open cavities opened on its receiving surface, sand the samples of the elaborated colored materials are in liquid state and deposited into the cavities.

FIGS. 14A, 14B and 14C are three schemas which represent the successive steps according to a third possible variant embodiment, in which the substratum may be the casing itself.

FIG. 15 is a photo taken with the smartphone comprising the photographed AOI target and the photographed N color measurement targets.

DETAILED DESCRIPTION

The description and the sense of words that are used must be comprised in the light of the field of the invention, the general knowledge of the man of the art, and the context of the invention, as presented above.

The description is made by reference to the embodiment where the measure of the color of an AOI target being an area of interest of a more or less flat surface S of an original unaltered material M (subsequently designates "material"), from its exterior side, is done in relationship with N color measurement targets 17, by illumination and reflection of light on the AOI target and the N color measurement targets 17, taking a photo (FIG. 15) of the illuminated AOI target and the N color measurement targets 17, and doing an appropriate processing for measuring color in a photo. According to one possible application, the material M to which the color is measured is the skin of a human being and the measurement of its color can be intended more particularly for cosmetic or analogous purposes.

A mobile phone accessory 1, as it is depicted on the drawings, is suitable and intended, for use, to be functionally and structurally associated with a smartphone 2 or more generally a portable digital device or multifunction mobile, capable of running a program for executing functions through an operating system. The expression "suitable and intended" used in relationship to a certain means and introducing one or several technical, functional and/or structural characteristics, and/or applications, and/on purposes, must be interpret in the sense that such means is arranged, designed, built, implemented, in such a manner that, for use, said means has or can have these functional and/or structural characteristics, and/or is used or can be used for such applications, and/on fulfills or can be fulfill such purposes. Consequently, this certain means has implicitly the features making it possible such characteristics, applications, purposes, even if they are not specifically mentioned or described. The expression "for use" must be interpret in the sense that in a situation where a color measurement of the AOI target can be done, for example when the flash is on and the camera is on. The word "associated" in relationship to two means must be interpret in the sense that such two means are connected in a certain manner to a common purpose, or result, that means are joined functionally and/or structurally. The word "functionally" refers to a way of working to have a certain result. The word "structurally" refers to a material realization or arrangement.

The invention relates as well to the mobile phone accessory 1 itself and a device 1+2 comprising the mobile phone accessory 1 and the smartphone 2 both combined as well structurally and functionally, that can be used in an autonomous way in the sense that a user having available the device 1+2 has the possibility to handle and to move it by itself and is in a situation to ensure the measure of the color of the AOI target, without other device, and without electrical connection to another device. The invention relates also to the process to implement the device 1+2 in order to measure the color of the AOI target. The invention relates also to the specific application of the device 1+2 or the process to measure the color of the skin of a human being. The invention relates also to a photo obtained with the device and allowing to measure the color of an AOI target.

When combined structurally, the smartphone 2 and the mobile phone accessory 1 are unified to be handled as a unity. There is provided at this end a removable connecting means 3 to fix the mobile phone accessory 1 onto the smartphone 2. With the depicted example of the drawings, such means comprises a double clip 3a and 3b that may exert a biasing maintaining force as well on the mobile phone accessory 1 and the smartphone 2. For example, the double connecting clip 3a and 3b may be deformable elastically and it can comprise, forming one piece, two perpendicular parts having each a shape of ring sector. One such ring sector is suitable and intended to be fixed around the mobile phone accessory 1 and the other ring is suitable and intended adapted to grip the smartphone 2. According to the various embodiments, such double clip 3a and 3b is either a piece by itself which is distinct and separate from the mobile phone accessory 1 and the smartphone 2, or integral with the mobile phone accessory 1 or a casing for the smartphone 2.

The smartphone 2 comprises intrinsically a housing 4 having among others control, navigation and functional buttons and touches 5, functional ports, a front face 6 with a display 7 providing tactile touches, a rear face 8 with a camera lens 9 and a flash 10 that can be implemented in combination with the mobile phone accessory 1. The smartphone 2 may be a standard smartphone of the market. The smartphone 2 comprises also an appropriate processing for measuring color in a photo, such as a loaded app. Such an appropriate processing for measuring color in a photo is based on the principle to measure a color of an AOI target by comparison of the color of the photographed AOI target with the colors of the photographed color measurement targets 17 of the color measurement area unity 17a, the photographed AOI target and the photographed color measurement targets 17 being on the same photo obtained with the same illumination conditions, which mean a light homogeneously distributed throughout the extension of the AOI target and the color measurement targets 17, the colors of all the targets being precise. According to a different but equivalent embodiment, instead of an app loaded on the smartphone 2, it is provided an arrangement in which the smartphone 2 fulfills a transmission to a different location or a different processing device where is done the appropriate processing for measuring color in a photo.

Such an appropriate processing for measuring color in a photo is known from the man of the art or easily available. The color measurement targets 17 are so named with the qualifier "measurement" for the reason that the function fulfilled by such targets 17 is the precise measurement of the color of the AOI target, by means of a common photo of both the AOI target and the color measurement targets 17, with the same homogeneous illumination conditions, and a further processing. The mobile phone accessory 1 itself is not loaded or does not include any color measuring processing photo.

To describe the mobile phone accessory 1, it is referred to a main reference plane P of it. The main reference plane P is more or less parallel to the more or less flat surface S of the material M.

The mobile phone accessory 1 comprises a casing 11 which is a support means for the constituent elements or means of the mobile phone accessory 1 which are thus protected. The casing 11 is also a handling means allowing the user to structurally associate or dissociate the mobile phone accessory 1 to the smartphone 2 easily and fastly.

The casing 11 comprises an opaque and rigid exterior wall, for example in plastics material, which delimits an internal space 11a. The constituent elements or means of the mobile phone accessory 1 are housed within the internal space 11a. The internal space 11a is adapted, for use, not to be disturbed by light from outside the accessory (ambient light). On one hand, the internal space 11a may be divided virtually into a so-called lighting side 12a and a so-called camera visual field side 12b, both being in communication without physical separation between them. On the other hand, the internal space 11a may be divided virtually into a so-called targets side 12c (AOI target and color measurement targets 17) and a so-called scattering and camera side 12d. The wall of the casing 11 and the casing 11 itself has an inner face 13a and an outer face 13b. The inner face 13a is on the side of the internal space 11a and is not reflective light such as matte black. The outer face 13b is accessible to the user's hand and to the contact of the material M with the AOI target. It may be also matte black. The wall of the casing 11 comprises several portions arranged continuously: a front wall portion 14a, a rear wall portion 14b and an annular peripheral wall portion 14c. The front wall portion 14a and the rear wall portion 14b extend both more or less parallel between them and to the reference plane P. They are facing each other at least partly, spaced from each other, and connected by the peripheral wall portion 14c which determines the spacing between the front wall portion 14a and the rear wall portion 14b, which must be adapted to optical requirements. The qualifiers "front" and "rear", of the related wall portions 14a, 14b, are not restrictive. They are used to distinguish the two wall portions 14a and 14b. The qualifier "front" relates to the wall portion 14a situated towards the material M. The qualifier "rear" relates to the wall portion 14b which is opposite to the front wall portion 14a. The front wall portion 14a and its inner face 13a and its outer face 13b extends at least substantially flat on a significant length on both directions of the reference plane P (contrary to a simple edge). According to an embodiment, the inner face 13a of the front wall portion 14a extends at least substantially flat, while being curved with a small concavity facing the internal space 11a.

The described arrangement allows to the casing 11 and the mobile phone accessory 1 to have a general shape of a half-truncated spheroid having opposite sides, respectively bulbous (on the side of the rear wall portion 14b) and tapered (on the side of the front wall portion 14a), as it is depicted on the drawings (FIGS. 2, 3B, 4, 5A and 5B). Such a general shape permits to position properly the constituent elements or means of the mobile phone accessory 1. Such a general shape is also ergonomic, allowing the casing 11 to be easily handled within the palm of the hand. Such general shape is comprised in an envelope having a length of about 4.2 cm, a width of about 3 cm and a thickness of about 2.7 cm. The entire casing 11 may be obtained by rigid assembly of two half-shells that, in normal conditions, cannot be disassembled. One half-shell 11b is located on the targets side 12c and comprises the front wall portion 14a, and the other half-shell 11c is located on scattering and camera side 12d and comprises the rear wall portion 14b.

The front wall portion 14a makes it possible, for use, to form a light incident spot 15, at least substantially flat, substantially located within the lighting side 12a and the targets side 12c. Light incident spot 15 means an area on a back or on a support, being more or less round, which is lighted more than its neighborhood, due to incident light beams directed onto this area. Saying that, the front wall portion 14a makes it possible to form a light incident spot 15 means that when the light beams are directed onto the inner face 13a of the front wall portion 14a, it appears onto this inner face 13a and onto the material M located in front of a measuring orifice 16, a light incident spot 15. The light incident spot 15 has a so-called spot center 15a.

The front wall portion 14a comprises a through measuring orifice 16, being in particular more or less circular or polygonal, which is placed within the location of the light incident spot 15 and opens into the lighting side 12a and the targets side 12c. The through measuring orifice 16 is located more or less in the center part of the front wall portion 14a and its area is limited to a part of the area the front wall portion 14a. The measuring orifice 16 has a center which is the spot center 15a. The measuring orifice 16 is suitable and intended to be associated with the material M and its AOI target and with the color measurement targets 17. The measuring orifice 16 makes it possible for the AOI target, which is located outside of the casing 11, to be illuminated from the internal space 11a and so to be a part of the light incident spot 15 and included within. The main aim of the measuring orifice 16 is so to permit to measure the color of the AOI target, not the visualization, by itself, of an extended area of the material M (in order to detect imperfections of the material). The thickness of the wall of the casing 11 around the measuring orifice 16 is as low as possible in order to avoid any ambient occlusion of the AOI target and to allow a similar distance between the camera and the AOI target and the N color measurement targets 17. According to an embodiment, a thickness of about 1 mm is appropriate. The color measurement targets 17 also illuminated from the internal space 11a are also a part of the light incident spot 15 and included within.

On the outer face 13b of the front wall portion 14a of the casing 11, is provided an area surrounding the measuring orifice 16, which extends at least substantially on both directions of the reference plane P. In a possible embodiment non represented, the surrounding area may comprise a continuous looped soft rim adapted and intended to put in contact the mobile phone accessory 1 with the material M located outside, around the AOI target, and to conceal any passage of ambient exterior light between the outer face 13b of the casing 11 and the material M on which it is in contact. When the material M and the rim are put in mutual contact, the AOI target is visible from the internal space 11a through the measuring orifice 16 and is illuminated only by the light beams forming the light incident spot 15, in which is included the AOI target and the color measurement targets 17, and not by the ambient light. Instead of the provision of a specific rim, it may be possible, according to the depicted example of the drawings, that the outer face 13b of the casing 11 is simply flat and smooth to ensure a sufficiently extended contact with the material without passage of ambient light. With the depicted example of the drawings, the radius of the measuring orifice 16 may as an example be comprised between 3 cm and 6 cm, in particular between 4 cm and 5 cm, in particular equal or close to 4.5 cm. The outside radius of the front wall portion 14a may be for example three to five times (and possibly even more) the radius of the measuring orifice 16.

With the depicted example of the drawings of the figures, the mobile phone accessory 1 includes intrinsically the N color measurement targets 17. The N color measurement targets 17 have defined colors within a narrow gamut of colors representing the whole range of AOI target colors. The N color measurement targets 17, constitute together a so-called "color measurement area unity" 17a, which reflects the fact that the N color measurement targets 17 must be viewed as forming functionally a unity to allow the measure of the color of the AOI target and forming structurally an area. The number N of color measurement targets 17 is selected to give an accurate value of the color of the AOI target. As an example, N is at least 20 and less than 50, in particular less than 40, in particular less than 30. In particular, according to an embodiment, N is equal or close to 25, such a number of color measurement targets 17 being appropriate to permit an accurate measure of the color of the AIO target such as a skin target. The N color measurement targets 17 are located within the lighting side 12a and the targets side 12c of the internal space 11a and fixed onto the inner face 13a of the front wall portion 14a. A basis of the invention is the selection of the appropriate sufficient number N of the color measurement targets 17 and the selection of the appropriate defined colors within a narrow gamut of colors representing the whole range of AOI target colors, in such a way that the use of the color measurement area unity 17a makes possible to measure the color of the AOI target.

According to one possible embodiment, the N color measurement targets 17 are fixed directly onto the inner face 13a of the front wall portion 14a. According to one other possible embodiment, the N color measurement targets 17 are fixed indirectly onto the inner face 13a of the front wall portion 14a by means of an intermediate substratum. In that later case, firstly the N color measurement targets 17 are fixed on the substratum and secondly the substratum, comprising the N color measurement targets 17, is fixed onto the inner face 13a of the front wall portion 14a. In such a case, the mobile phone accessory 1 has not included intrinsically, originally, the N color measurement targets 17, but they are reported on it later.

The N color measurement targets 17 and so, the color measurement area unity 17a, are placed within the location of the light incident spot 15, and adjacent, close, and around, the measuring orifice 16. Typically, the color measurement area unity 17a is annular with a shape being in particular circular or polygonal. The color measurement area unity 17a has a center which is also the spot center 15a.

With the depicted example of the drawings, the N color measurement targets 17 are arranged side by side along at least one line of the color calibration area unity 17a, such as a circle, and there are several such a line (such as two lines on FIG. 6), so that the color measurement targets 17 belonging to two successive lines are arranged side by side, being interposed (see FIG. 6). On one hand, according to an embodiment, firstly, the greater radius of the color measurement area unity 17a is less than 4 times the radius of the measuring orifice 16, in particular less than 3 times and, secondly, the greater radius of the color measurement area unity 17a is more than 2 times the radius of the measuring orifice 16. For example, the greater radius of the color measurement area unity 17a is about 2.5 cm. On the other hand, according to an embodiment, the radius of one color measurement target 17 is less than 1 cm, in particular less than 0.7 cm, in particular less than 0.5 cm, in particular equal or close to 0.2 cm. So, the volume of each color calibration target may be around 13 to 15 mm$^3$.

There are various processes to realize the N color measurement targets 17, that means to realize N color measurement targets 17 fixed onto the inner face 13a of the front wall portion 14a with the arrangement previously described. According one possible embodiment which can itself be the subject of several variant embodiments, such realization process comprises the steps now described.

The process starts with having available large quantities of liquid several basic colored materials, of which fractions can be took. Such basic colored materials are those which are necessary to obtain by mixture of appropriate quantities thereof the material of the N color measurement targets 17. In other words, the different colors of the basic colored materials have been selected in order to obtain color measurement targets 17 material having the N colors of the narrow gamut of colors representing the whole range of AOI target colors. The manufacturer of the mobile phone accessory 1 for color measurement is capable, as soon as he or she knows the kind of material with whom the device 1+2 shall be used, to determine by himself or herself or to obtain from a specialist of colors measurement with color measurement targets, the necessary colors of the basic colored materials, and further to obtain adequate basic colored materials.

The process needs having available a substratum 18, in solid state. The substratum 18 must be suitable and intended to receive and hold the N color measurement targets 17 and to allow, in fine, the N color measurement targets 17 to be fixed onto the inner face 13a of the front wall portion 14a with the arrangement previously described. To that, substratum 18 has a flat receiving surface 18a onto are fixed the N color measurement targets 17. According to one possible variant embodiment, the substratum 18 is the casing 11 itself, or more exactly, the part of the casing 11 at the light incident spot 15. The receiving surface 18a of the substratum 18 is then the inner face 13a of the casing 11. According to one other possible variant embodiment, the substratum 18 is not the casing 11 itself, but a separate solid-state support 18 being suitable and intended to be later (when garnished with the N color measurement targets 17) fixed onto the inner face 13a of the casing 11 at the light incident spot 15. Such a solid-state support or substratum 18 can be a thin plate or film which one side is the receiving surface 18a and the opposite side surface 18b is a fixation surface onto the inner face 13a of the casing 11. According to the realizations, the solid-state support or substrate 18 is stable in shape or has a certain flexibility to perfectly match the shape of the inner face 13a of the front wall portion 14a.

The process continues with preparing N stocks of elaborated colored materials from said basic colored materials. This is done by mixing adequate and precise fractions of certain identified basic colored materials, so that each of said N stocks of the elaborated colored material has a precise color being exactly the color of an intended color measurement target.

The process continues with sampling a small amount of elaborated colored material from each said N stocks. By doing that, are finally available N samples of small amount of the elaborated colored materials having exactly the color of the N color measurement targets 17 which can be used to realize the N color measurement targets 17 on said substratum 18.

These combination of operation steps has for advantage, among other, to have at disposal a large quantity of the elaborated colored materials with the precise demanding color allowing to realize a large quantity of color measurement targets 17 which, also the precise demanding color.

The process continues with depositing said N samples of the elaborated colored materials so realized onto said substratum 18 so as to form a color measurement area unity 17a having N color measurement targets 17 in proper order and arrangement onto the inner face 13a of the exterior wall of the casing 11.

According to a first possible variant embodiment (FIGS. 12A, 12B and 12C), said substratum 18 is a solid-state support provided with through holes 18c side by side, arranged according the same pattern as the demanding pattern of the N color measurement targets 17. Said N samples of the elaborated colored materials are in solid state and in complementary shape of the holes 18c of the substratum 18. Here, depositing said N samples of the elaborated colored materials onto substrate means introducing each solid-state sample of the elaborated colored material into a hole.

According to a second possible variant embodiment (FIGS. 13A, 13B and 13C), said substratum 18 is a solid-state support provided with recesses 18d opened on the receiving surface 18a arranged according the same pattern as the demanding pattern of the N color measurement targets 17. Said N samples of the elaborated colored materials are in liquid state. Here, depositing said N samples of the elaborated colored materials onto substrate means depositing each liquid-state sample of the elaborated colored material into a recess 18d, with a final hardening.

With the first and second embodiments, the solid-state support or substratum 18 being garnished with the N color measurement targets 17 is further rigidly fixed onto the inner face 13a of the outer wall at the proper place by means of ultrasonic welding, glue, or any other equivalent fixation means. According to possibilities, the solid-state support or substratum 18 is in one piece or comprises several pieces combined.

According to a third possible variant embodiment (FIGS. 14A, 14B and 14C), said substratum 18 is the casing 11 itself, or more exactly, as said, the part of the casing 11 at the light incident spot 15, the receiving surface 18a being the inner face 13a of the casing 11. Said N samples of the elaborated colored materials are in liquid state. Here, depositing said N samples of the elaborated colored materials onto substrate means depositing each liquid-state sample of the elaborated colored material onto the proper place of the inner face 13a of the casing 11, with a final hardening. In this variant embodiment, it is provided means suitable and intended means for depositing the N color measurement targets 17 in the order and arrangement desired. Such means may be or comprised a programmed robot and/or small open cavities onto the inner face 13a of the casing 11. Such programmed robot may be comprised by methods to deposit the N color measurement targets 17.

According to another embodiment, not represented, the mobile phone accessory 1 includes means to associate functionally, and in particular also structurally, the N color measurement targets 17. In such embodiment, the mobile phone accessory 1 has not included intrinsically, originally, the N color measurement targets 17.

The mobile phone accessory 1 comprises also a camera field of view 19, having a field of view axis 19a which, with the depicted example of the drawings, is perpendicular to the reference plane P and located within the camera visual field side 12b of the internal space 11a, the camera field of view 19 being arranged in the casing 11. The expression "field of view" in relationship with a camera, which can also be called "visual field" or "angle of view", corresponds to the area of space that the camera perceives. It is the solid angle through which the camera is sensitive to light. The camera field of view 19 is associated with a camera which is extrinsic to the mobile phone accessory 1 since it is the camera of the smartphone 2, having the camera lens 9. Consequently, the mobile phone accessory 1 does not include intrinsically a camera.

The rear wall portion 14b comprises a camera window 20, belonging to the camera field of view 19, having a camera window center 20a and passing to it the field of view axis 19a. The camera window 20 is in particular more or less circular or polygonal. The camera window 20 opens into the camera visual field side 12b and the scattering and camera side 12d of the internal space 11a. The camera window 20 is suitable and intended to be associated with the camera lens 9 of the smartphone 2, being put in contact reciprocally coaxially, and so maintained with the removable connecting means 3 to fix the mobile phone accessory 1 onto the smartphone 2. The camera window 20 makes it possible to do at the same time a photo of both the AOI target and the N color measurement targets 17, arranged at the neighborhood of the AOI target. With the depicted example of the drawings, it is provided a lens 21 within the camera visual field side 12b, adjacent to the inner face 13a of the rear wall portion 14b. Such a lens 21 is required, if necessary, in order to have a semi-focus on the center of the AOI target (on the axis 19a), and a semi-focus on—if not all—at least a significant number of the centers of the N color measurement targets 17, such as a majority of such targets 17. If there is a lens 21, it is arranged in a fixed position and the user has not to to move it axially or to replace it, while the mobile phone accessory 1 has no slider or equivalent means to move the lens.

On the outer face 13b of the rear wall portion 14b of the casing 11, it may be provided according to an embodiment not represented a relief surrounding the camera window 20, adapted and intended to put in contact the outer face 13b of the rear wall portion 14b of the mobile phone accessory 1 with the rear face of the smartphone 2. The radius of the camera window 20 may be comprised between 0.3 cm and 2 cm. The transversal distance, relative to the reference plane P, between the rear wall portion 14b and the front wall portion 14a, more precisely, between the camera window 20 and the measuring orifice 16 may be, with the depicted example of the drawings and a possible embodiment, comprised between 2 cm and 8 cm.

The mobile phone accessory 1 comprises also a lighting means 22 to which is associated functionally a light scattering means 23 (or 27 as seen later regarding plate). The lighting means 22, arranged at least partly in the casing 11, is adapted and intended to produce, for use, the light illuminating the light incident spot 15 and so, the AOI target and the N color measurement targets 17. The light scattering means 23 is adapted and intended to scatter the light of the lighting means 22 so that the light which illuminates the light incident spot 15 (and so the AOI target and the N color measurement targets 17) is homogeneous on its entire extent.

The lighting means 22 is associated with a light source which is extrinsic to the mobile phone accessory 1 since it is the flash 10 of the smartphone 2. So, the mobile phone accessory 1 does not include intrinsically a light source such as a LED.

With the depicted example of the drawings, the rear wall portion 14b comprises a lighting window 24, having a lighting window center 24a and passing to it a lighting axis 22a perpendicular to the reference plan. The lighting window 24 belongs to the lighting means 22. The lighting window 24 opens into the lighting side 12a and the scattering and camera side 12d. With the depicted example of the drawings, the rear wall portion 14b comprises a lighting window 24, having a lighting window center 24a and passing to it a lighting axis 22a, belonging to lighting means 22 which opens into the lighting side 12a and the scattering and camera side 12d.

The lighting window 24 is suitable and intended to be associated with the flash 10 of the smartphone 2, coaxially, and so maintained with the removable connecting means 3. The lighting window 24 makes it possible to illuminate both the AOI target and the N color measurement targets 17 with the flash 10 of the smartphone 2. With the depicted example of the drawings, the lighting window 24 is not necessarily in full contact reciprocally with the rear face of the smartphone 2, a thin space can be acceptable between them. According to another possible embodiment, not represented, on the outer face 13b of the casing rear portion, it may be provided a relief surrounding the lighting window 24, adapted and intended to put in contact the outer face 13b of the rear wall portion 14b of the mobile phone accessory 1 with the rear face of the smartphone 2. In all embodiments, the lighting window 24 is adapted and intended for the passage of the light beam produced by the flash 10 of the smartphone 2. In the second one, the lighting window 24 allow only the passage of light produced by the flash 10, while the passage of ambient exterior light being not possible. In a possible embodiment, the lighting window 24 is protected by a transparent material. According to possible embodiments, the dimension of the lighting window 24 may be comprised between 0.3 cm and 2 cm. According to another embodiment, instead of a lighting window 24, it is provided a lighting area being transparent or translucent, arranged at the same place, on the rear wall portion 14b located in the lighting side 12a, and having also, like the lighting window 24, a lighting axis and a lighting window center 24a.

With the lighting window 24 or the lighting area, the light beam coming from the flash 10 of the smartphone 2 is guided and shaped so as that a more or less a parallel light (with respect of the lighting axis 22a) enters in the lighting side 12a. The lighting means 22, the light scattering means 23 and the camera field of view 19 are so arranged that the light beam produced by the flash 10 and diffused by the light scattering means, 23 hits the light incident spot 15, which is included within the camera field of view 19, without obstacle between (such as a mirror or the like).

The lighting window 24 or the lighting area is sufficiently extended to make possible its functional association with the flash 10 of the smartphone 2 whatever is the configuration and the size of the smartphone 2. So, according to the depicted example of the drawings, the lighting window 24 has an oblong shape. According to possible embodiments, the distance between the camera window center 20a and the lighting window center 24a, i.e. the space between the field of view axis 19a and the lighting axis 22a may be comprised between 0.8 cm and 2 cm.

The light scattering means 23 is disposed at least partly in the casing 11 and, with the depicted example of the drawings, the light scattering means 23 is entirely disposed within the casing 11. The light scattering means 23 is adapted and intended, for use, to be functionally associated with the lighting means 22. The light scattering means 23 has a function of homogenization the lighting of the light incident spot 15 with its content (the AOI target and the N color measurement targets 17). The light scattering means 23 includes at least two extended portions 25 and 26, having different degrees of opacity OPA % for the light of the lighting means 22.

The word "opacity" applied to an object, like a plate or a sheet having two opposite faces, means here the measure of the ability of this object, to prevent the passage through it (from one face to the other) of the light produced by the flash of a smartphone. The higher the measure of opacity, the more opaque the object is. If the degree of opacity OPA % is 100%, the object is fully opaque since no light passes through. If the degree of opacity OPA % is 0%, the object is transparent since all the light passes through. If some light, but not all, passes through the object, it is translucent.

The expression "high-opacity" means here, in an absolute sense, an opacity having a degree of opacity OPA % which is comprised between 70% and 100%. The expression "higher-opacity" means here, in a relative sense, an opacity which has a degree of opacity OPA % greater than another one. On the contrary, the expression "lower-opacity" means here, in a relative sense, an opacity which has a degree of opacity OPA % smaller than another one. An object may have, for all of its face, either a constant degree of opacity OPA % or a variable degree of opacity OPA %, being higher in one or several areas of its face and lower in one or several other areas. The degree of opacity OPA % of the portions 25 and 26, and between them, can vary either discretely or continuously. In a possible embodiment it can varies discretely by alternating high opacity portions with low opacity portions hence creating an opacity which averages between the one of the high opacity portions and the one of the low opacity portions. For example, the scattering means 23 comprises a pattern of dots with said high opacity portions (FIGS. 8A and 8E).

With the depicted example of the drawings, the light scattering means 23 is in the form of a plate 27, mounted on the casing 11 and carried by it, in a fixed position, called here scattering plate 27. The scattering plate 27 is rigid and full (except the scattering opening 30 mentioned later). According to a possible embodiment, the scattering plate 27 is relatively thin such as around 0.5 mm. According to a first possible embodiment, the scattering plate 27 is plane (i.e. extended along a plane). According to a second possible embodiment, the scattering plate 27 is curved like a portion of a cylinder or a portion of a sphere, i.e. a cap sphere. In that later case, the axis of the cylinder or the center of the sphere is either an axis passing by the lighting window center 24a or the lighting window center 24a itself. The further description is made in relation to the first embodiment where the scattering plate 27 is flat.

The scattering plate 27 is a different piece of the casing 11. The scattering plate 27 is properly structurally associated to the casing 11 to be maintained in a fix position. For this purpose, the casing 11 and/or the scattering plate 27 may have appropriate protrusions or hollows or, for the casing 11, the adapted shape of the inner face 13a. With the depicted example of the drawings, it is provided, on one hand, a collar 28a being part of the casing 11, located around the camera window 20 and it may comprise a return of the inner face 13a of the casing 11, on which is in support the scattering plate 27, and, on the other hand, a protrusion 28b of the scattering plate 27 coming against the inner face 13a of the rear wall portion 14b. Into the casing 11 and the internal space 11a, the scattering plate 27 is disposed parallel to the reference plane P. The scattering plate 27 separates the scattering and camera side 12d to the targets side 12c. The scattering plate 27 has two opposite faces, respectively a front face 29a and a rear face 29b, and around a peripheral edge 29c. The front face 29a of the scattering plate 27 is the face turned towards the targets side 12c, the AOI target and the N color measurement targets 17. The rear face 29b of the scattering plate 27 is the face turned towards the scattering and camera side 12d and the lighting window 24 or area. The qualifiers "front" and "rear", of the scattering plate 27, are not restrictive. They are used to distinguish the two faces 29a and 29b of the scattering plate 27. The qualifier "front" relates to the face of the scattering plate 27 turned towards the front wall portion 14a of the casing 11. The qualifier "rear" relates to the face of the scattering plate 27 turned towards the rear wall portion 14b of the casing 11. The scattering plate 27 is located at least within the lighting side 12a. However, with the depicted example of the drawings, the scattering plate 27 is located not only within the lighting side 12a but also within the camera side 12d, while having an opening, here called scattering opening 30, which is located and has a shape and dimensions allowing the camera field of view 19 not being shrunk, cut or distorted. In other words, the scattering opening 30 corresponds to the trace of the camera field of view 19 on the scattering plate 27. The qualifier "scattering" applied to the opening 30 is not limitative but used only to distinguish the opening 30 to others holes, apertures and the like of the accessory 1. The peripheral edge 29c of the scattering plate 27 is adjacent to the inner face 13a of the casing 11 at the peripheral annular exterior wall portion and, consequently, the shape of the edge is similar to the shape of a cut of the casing 11 by the plane of the scattering plate 27. With the depicted example of the drawings, the peripheral edge 29*c* has a rounded contour having one bulbous side 31*a* and one tapered side 31*b*, diametral opposed, i.e. an oval shape (in reference to the shape of an egg). The scattering plate 27 has two axis perpendicular to its plane, and plan P. Such two axis define on the scattering plate 27 two related light centers at the intersection with the scattering plate 27. One of the axis, is the field of view axis 19*a* which is located on the bulbous side 31*a* and which is also the axis of scattering opening 30. The other of the axis is the lighting axis 22*a* (of the lighting window 24 or lighting area) which is located on the tapered side 31*b*. Consequently, the scattering plate 27 has, on one hand, a so-called related camera field center 19*aa* at the intersection of the field of view axis 19*a* and the scattering plate 27, which is the center of the scattering opening 30. And the scattering plate 27 has, on the other hand, a so-called related lighting center 22*aa* at the intersection of the lighting axis 22*a* and the scattering plate 27. The scattering plate 27 is located in the vicinity of the lighting window 24 or the lighting area in such a manner that the light beam coming from the lighting window 24 or the lighting area fully hits the rear face 29*b* of the scattering plate 27. According to possible embodiments, the rear face 29*b* of the scattering plate 27 may be slightly spaced from the inner face of the lighting window 24 or the lighting area, for example of about 5 mm.

The scattering plate 27 is so arranged to include at least two extended portions 25, 26, having different degrees of opacity, OPA %, i.e. a first high-opacity portion 25 and a second low-opacity portion 26. The high-opacity portion 25 is disposed in the vicinity of the lighting window 24 or lighting area, between such lighting window 24 or lighting area (the location of which is represented in dotted lines on FIG. 6, FIG. 9 and FIGS. 10A to 10C), and the light incident spot 15 (and its content i.e. the AOI target and the N color measurement targets 17). The high-opacity portion 25 extends parallel to the reference plane P (when the scattering plate 27 is flat), in the vicinity of the rear wall portion 14*b*. The low-opacity portion 26 is disposed at the periphery (or at a part of the periphery) of the high-opacity portion 25. The low-opacity portion 26 has a degree of opacity OPA % smaller than that of the high-opacity portion 25, while the high-opacity portion 25 has a degree of opacity OPA % greater than that of the low-opacity portion 26. The high-opacity portion 25 has a degree of opacity OPA % greater than 70%, in particular greater than 80%, in particular greater than 90%, in particular equal to or close to 100%, being then fully opaque. The low-opacity portion 26 has a degree of opacity OPA % being smaller than 70%, in particular smaller than 10%, in particular equal to or close to 0%, being then fully transparent.

As represented among others on FIG. 9, the high-opacity portion 25 has a degree of opacity OPA % that is unequal throughout its extent, having, in combination, a greater degree of opacity OPA % in a first region 32*a* and a smaller degree of opacity OPA % in a second region 32*b*. The first region 32*a* is located on and around the related lighting center 22*aa* of the scattering plate 27, and on and around the axis between the lighting window center 24*a* and the spot center 15*a*. The second region 32*b* is located spaced of the related lighting center 22*aa* of the scattering plate 27 and spaced of the axis between the lighting window center 24*a* and the spot center 15*a*. In a first embodiment, the region 32*a* of greater degree of opacity OPA % may have itself, as regards its extent, a degree of opacity OPA % that is unequal, being higher on and around the related lighting center 22*aa* and smaller spaced from it. In a second embodiment, the region 32*a* of greater degree of opacity OPA % may have itself a unique same degree of opacity OPA %. Similarly, according to different possible embodiments, the region 32*b* of smaller degree of opacity OPA % may have itself, as regards its extent, a degree of opacity OPA % that is either unequal, being higher adjacent to the region 32*a* and smaller spaced from such region 32*a*, or the same. According to another embodiment, the high-opacity portion 25 has a degree of opacity OPA % that is the same throughout its extent, having a one single region as regards the degree of opacity OPA %.

Similarly, the low-opacity portion 26 may have itself, as regards its extent, a degree of opacity OPA % that is either unequal, being higher in a region 26*a* adjacent to the high-opacity portion 25 (and possibly its region 32*b*) and smaller in a region 26*b* spaced from the high-opacity portion 25 (and possibly its region 32*b*). According to another embodiment, the low-opacity portion 26 has a degree of opacity OPA % that is the same throughout its extent, having a one single region as regards the degree of opacity OPA %.

However, whatever is its realization, the scattering plate 27 has a high-opacity degree OPA %—in particular a full opacity—in a region 32*a* on and around its related lighting center 22*aa*, a low-opacity degree OPA %—in particular fully transparent—in a region 26*b* at the opposite of the region 32*a* and near the scattering opening 30, and decreasing degrees of opacity in regions from the region of high-opacity degree OPA % to the region of low-opacity degree. The degree of opacity OPA % of the scattering plate 27 varies either continuously or discretely. Reference is expressly made to FIGS. 9, 10A to 10C, and 11A to 11H which depicted different possible realizations, not limitative.

According to one possible embodiment, the scattering plate 27 may be made of one single plate. According to another embodiment, the scattering plate 27 may comprise several portions of plates placed and fixed end to end. According to another embodiment, the scattering plate 27 may comprise several portions of plates fixed overlapped.

The scattering plate 27 may be made in plastics material which is charged of blackout pigments with the desire density so as to obtain the appropriate variation of the degree of opacity OPA %. According to another realization, the scattering plate 27 may comprise a transparent back on which are fixed portions of film or dots having an opacity permitting to obtain the appropriate variation of the degree of opacity OPA %. According to the realization depicted of the FIGS. 8A and 8E, the scattering plate 27 comprises on the front face 29*a* a pattern of small protrusions 34 having free end transversal surfaces, on which are fixed small dots of aluminum foil (or composite including aluminum) died-cut from a band of aluminum (or composite including aluminum) 35. The pattern of protrusions (number of identical protrusions or surfaces of different protrusions) has a density according to the degree of opacity OPA % desired: the higher degree of opacity OPA %, the higher density is. The band of aluminum (or composite including aluminum) is died-cut to cover only the free end transversal surfaces of the protrusions and not the space between the protrusion, the remaining band being 36. In that manner, the density of dots of aluminum foil (or composite including aluminum) allow to obtain the appropriate willing degree of opacity OPA %. With the depicted example of the drawings (FIGS. 8B, 8C and 8D), the scattering plate 27 may have a rear face 29*d* having small pyramidal protrusions 33.

With an embodiment not represented in which the scattering plate 27 is located only within the lighting side 12*a* and not within the camera side 12*d*, the scattering plate 27 is shorter in length having an outer contour which is more or less a curvilinear triangle, with possibly, not the previously described scattering opening 30, with an opening having a closed contour on itself, but just an indentation allowing the camera field of view 19 not being shrunk, cut or distorted. Such indentation is an opening having a unclosed contour on itself. The expression "scattering opening 30" must be interpreted to include also such indentation having a unclosed contour on itself.

According to a possible realization, the mobile phone accessory 1 may have a weight comprised between 7.3 g and 10 g.

The invention relates also to the process to implement the device 1+2 comprising the smartphone 2 and the mobile phone accessory 1 to measure the color of the AOI target. In this process, one has available the material M having an area of interest AOI, the smartphone 2 and the mobile phone accessory 1. Thereafter one associates structurally properly the smartphone 2 and the mobile phone accessory 1, with the removable connecting means 3, so that the camera window 20 of the mobile phone accessory 1 is coupled to the camera lens 9 of the smartphone 2 and the lighting window 24 or lighting area of the mobile phone accessory 1 is coupled to the flash 10 of the smartphone 2. Thereafter, one applies reciprocally the material M and the mobile phone accessory 1 so that the material M is on the outer face 13b of the casing 11 with the AOI target in front of the measuring orifice 16.

Thereafter, one orders the smartphone 2 to do a flashlight and a photo 36. This implies and provokes an illumination and a reflection of light on the light incident spot 15, that is on the AOI target and on the N color measurement targets 17. The photo 36 is that of both the lighted AOI target and the lighted N color measurement targets 17, with the same illumination conditions, due to the arrangement of the lighting means 22, the light scattering means 23 and the camera field of view 19, as previously described. The photo 36 is then processed with an appropriate processing for measuring color in a photo, to compare the color of the photographed AOI target with the colors of the photographed N color measurement targets 17 of the color measurement area unity 17a, in order to measure the color of the AOI target. Such an appropriate processing for measuring color in a photo is a downloaded app loaded in the smartphone 2, or the smartphone 2 is arranged to fulfill a transmission to a different location or a different processing device where is done the appropriate processing for measuring color in a photo.

In a particular application, the process is carried out by a person willing to measure the color of his or her skin. This application is not limiting. The process may be carried out by somebody else as well as for personal purposes or professional purposes, the material M whose color we want to know may be not the skin but any other material M.

A photo 36 done with the arrangement of FIG. 9 is represented on FIG. 15. This photo 36 is suitable to be process with the color measuring process. The photo 36 comprises two adjacent zones 37 and 38, showing respectively the picture of the AOI target and the N color measurement targets 17. In the upper part of the FIG. 15 are represented two gray colored blocks being, from left to right, the color value of the lightest areas of the front wall portion and the color value of the darkest area of the front wall portion. The closer are those values, the more homogeneous is the light incident spot illuminating the measuring orifice 16 and the color measurement area unity 17a.

The measure of the AOI target is expressed in LAB units, in which L is lightness, a is green-red and b is yellow-blue.

The invention claimed is:

1. A mobile phone accessory, suitable and intended to be functionally and structurally associated with a smartphone capable of running a program for executing functions and having a camera and a flash, and to be associated with an area of interest (AOI) target of a material, comprising:

a support and handling casing having an opaque wall which delimits an internal space of the casing, the internal space being adapted, for use, not to be disturbed by light from outside, the opaque wall having an inner face and comprising an orifice suitable and intended to be associated with the material and the AOI target, located within a light incident spot, and a rear wall portion;

a lighting means having a lighting axis, arranged at least partly in the casing, adapted and intended to produce, for use, the light illuminating the light incident spot;

a camera field of view means, having a field of view axis, arranged at least partially in the casing, adapted and intended for use in making a reflection photo of the light incident spot and its content;

a scattering plate, located within the casing, adapted and intended, for use, to be functionally associated with the lighting means, having a scattering opening with a camera field center at the intersection of the field of view axis, and a lighting center at the intersection of the lighting axis, and comprising a high-opacity portion located near the lighting means and a low-opacity portion located at the periphery of the high-opacity portion;

wherein:

the casing comprises a front wall portion which extends facing and spaced from the rear wall portion and where is located the orifice, being a measuring orifice;

the outer face of the front wall portion comprises an area surrounding the measuring orifice adapted and intended to put in contact with the material located outside, around the AOI target, and to conceal any passage of ambient exterior light;

N color measurement targets are located within the internal space and fixed on the inner face of the front wall portion, sidely with the measurement orifice, forming together a color measurement area unity;

through the scattering opening is seen the light incident spot with the measuring orifice, and in use the AOI target, and the N color measurement targets, located within the camera field of view means; and the scattering plate has a varying degree of opacity, with a high-opacity degree in portion or region on and around the lighting center, a low-opacity degree in portion or region at the opposite and near the scattering opening, and decreasing degrees of opacity from portion or region with high-opacity degree to portion or region with low-opacity degree, the scattering plate making a light homogeneously distributed throughout the extension of the AOI target and the N color measurement targets, the mobile phone accessory being so suitable and intended to allow to do a photo of the lighted AOI target and the lighted N color measurement targets, with the same homogeneous illumination conditions.

2. The mobile phone accessory according to claim 1, in which the high-opacity portion and the low-opacity portion each has a degree of opacity unequal regarding its extent, the scattering plate having a high-opacity degree in a region on and around the lighting center, a low-opacity degree in a region at the opposite of the region and near the scattering opening, and decreasing degrees of opacity in regions from the region of high-opacity degree to the region of low-opacity degree.

3. The mobile phone accessory according to claim 1, in which the degree of opacity of the scattering plate varies either continuously or discretely.

4. The mobile phone accessory according to claim 1, in which the degree of opacity of the high-opacity portion or its region is greater than that of the low-opacity portion or its region, being greater than 70% opaque.

5. The mobile phone accessory according to claim 1, in which the degree of opacity of the low-opacity portion or its region is smaller than that of the high-opacity portion or its region, being smaller than 70% transparent.

6. The mobile phone accessory according to claim 1, in which the degree of opacity of the scattering plate varies from fully opaque to fully transparent.

7. The mobile phone accessory according to claim 1, in which the scattering plate is made in plastics material charged of blackout pigments with the desire density so as to obtain the appropriate variation of the degree of opacity.

8. The mobile phone accessory according to claim 1, in which the scattering plate comprises a transparent back on which are fixed portions of film or dots having an opacity permitting to obtain the appropriate variation of the degree of opacity.

9. The mobile phone accessory according to claim 8, in which the scattering device alternates high opacity portions with low opacity portions so as to create an opacity which averages between them.

10. The mobile phone accessory according to claim 1, wherein the mobile phone accessory does not include intrinsically a light source and the lighting means is configured to be associated with a flash of a smartphone as a light source extrinsic to the mobile phone accessory.

11. The mobile phone accessory according to claim 1, in which the camera field of view means includes a camera window located within the rear wall portion, adapted and intended for the passage of a visual field from a camera of a smartphone extrinsic to the accessory, wherein the mobile phone accessory does not include intrinsically a camera.

12. The mobile phone accessory according to claim 1, in which the camera visual field of view means comprises a lens in order to have a semi-focus on the center of the AOI target, and a semi-focus on at least a majority of the centers of the N color measurement targets.

13. The mobile phone accessory according to claim 1, in which the number N of color measurement targets is sufficient to permit an accurate measure of the color of the AOI target and to define colors within a narrow gamut of colors representing the whole range of AOI target colors, forming together a color measurement area unity, the mobile phone accessory being so suitable and intended to allow to measure the color of the AOI target, by allowing to do a photo of the lighted AOI target and the lighted N color measurement targets, with the same illuminations conditions, such photo being processed to compare the color of the photographed AOI target with the colors of the photographed color measurement targets of the color measurement area unity, in order to measure the color of the AOI target.

14. The mobile phone accessory according to claim 1, in which the color measurement targets are arranged side by side along at least one line of the color measurement area unity, while the color measurement targets belonging to two successive lines are arranged side by side.

15. The mobile phone accessory according to claim 1, in which the color measurement area unity has a greater radius being firstly less than 4 times the radius of the measuring orifice.

16. The mobile phone accessory according to claim 1, in which the number N of the color measurement targets that is sufficient to permit an accurate measure of the color of the AOI target is less than 50.

17. The mobile phone accessory according to claim 1, in which one color measurement target is in shape of a dot has a width less than 1 cm.

18. The mobile phone accessory according to claim 1, wherein the process to realize the color measurement area unity of the N color measurement targets, comprising the following steps:
    having available a sufficient quantity of basic colored materials to obtain N color measurement targets representing a whole range of colors of the AOI target, of which fractions can be taken;
    having available substratum, being either the casing or a separate substratum later fixed onto the casing;
    preparing N stocks of elaborated colored materials from the basic colored materials, by mixing adequate fractions of certain identified basic colored materials, so that each stock of elaborated colored material has a precise color being exactly the color of an intended color measurement target;
    sampling a small amount of elaborated colored material from each the N stocks, so as to have available N samples of small amount of the elaborated colored materials;
    depositing the N samples of the elaborated colored materials, in proper order and arrangement, onto the substratum so as to form the color measurement area unity of the N color measurement targets so that the device comprises a number N of color measurement targets between at least 20 and less than 30 within a narrow gamut of colors, each color measurement target being in a shape of a dot having a radius less than 1 cm and a volume about 13 to 15 mm$^3$, the N color measurement targets constituting together a color measurement area unity fixed onto the inner face of the front wall portion, placed within the location of the light incident spot, and adjacent, close, and around the measuring orifice, the N color measurement targets being arranged side by side along at least one line of the color measurement area unity being annular with a center which is the center of the spot center.

19. A device for measuring the color of an area of interest (AOI) target being an area of interest of a material, in relationship with an appropriate N color measurement targets having defined colors within a narrow gamut of colors representing the whole range of AOI target colors, by doing an illumination and a reflection of light on the AOI target and the N color measurement targets, a photo of the illuminated AOI target and the illuminated color measurement targets with the same homogeneous illuminations conditions, such photo being processed to compare the color of the photographed AOI target with the colors of the photographed color measurement targets of the color measurement area unity, in order to measure the color of the AOI target, comprising:
    a smartphone being capable of running a program for executing functions and having a camera, a flash, and a processing means for measuring color in a photo;
    a mobile phone accessory according to claim 1; and a removable connecting means to fix the mobile phone accessory onto the smartphone.

20. The device for measuring the color of an AOI target according to claim 19, in which:
- the light to illuminate the AOI target and the N color measurement targets is the flash of the smartphone;
- the camera to do the photo of the illuminated AOI target and the N color measurement targets is the camera of the smartphone;
- the mobile phone accessory being arranged to allow the passage of a light beam produced by the flash of the smartphone, and to allow the passage of a visual field from the camera of the smartphone;
- an processing means for measuring color in a photo being loaded in the smartphone, not in the mobile phone accessory.

21. A process for measuring the color of an AOI target being an area of interest of a material, in which:
- having available a material having an area of interest AOI of such material;
- having available a smartphone capable of running a program for executing functions and having a camera and a flash, on which is loaded a processing means for measuring color in a photo;
- having available a mobile phone accessory according to claim 1;
- associating structurally the smartphone and the mobile phone accessory by means of a removable connecting means;
- applying reciprocally the material and the mobile phone accessory so that the material M is on the outer face of the casing with the AOI target in front of the measuring orifice;
- ordering the smartphone to do a flashlight and a photo with an illumination and a reflection of light on the AOI target and the color measurement targets and a photo of the illuminated AOI target and the color measurement targets, with the same homogeneous illuminations conditions; and
- with the processing means for measuring color in a photo, processing the photo so as to measure the color of AOI target.

* * * * *